(12) United States Patent
Yamazaki

(10) Patent No.: US 7,173,743 B2
(45) Date of Patent: Feb. 6, 2007

(54) IMAGE READING APPARATUS AND METHOD

(75) Inventor: Yoshiro Yamazaki, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 970 days.

(21) Appl. No.: 09/728,930

(22) Filed: Dec. 4, 2000

(65) Prior Publication Data
US 2002/0033975 A1    Mar. 21, 2002

(30) Foreign Application Priority Data
Dec. 2, 1999  (JP) .................................. 11-343565
Nov. 20, 2000 (JP) .............................. 2000-352261

(51) Int. Cl.
*H04N 1/04*   (2006.01)
*H04N 1/46*   (2006.01)

(52) U.S. Cl. ...................... 358/483; 358/443; 358/453; 358/3.07; 358/519; 358/450; 358/518; 345/675; 345/584; 345/254; 382/284; 382/254; 382/162

(58) Field of Classification Search ................ 358/515, 358/518–519, 524, 529, 504, 506, 512, 513, 358/514, 443, 461, 464, 483, 453, 3.07, 450, 358/521; 382/167, 284, 254, 162; 348/22, 348/96, 97, 98, 195, 254, 260, 675, 584, 348/674, 235
See application file for complete search history.

(56) References Cited

U.S. PATENT DOCUMENTS 5,266,805 A * 11/1993 Edgar .......................... 250/330
5,489,989 A *  2/1996 Shimizu et al. .............. 358/401
5,892,595 A *  4/1999 Yamakawa et al. ......... 358/530
5,982,951 A * 11/1999 Katayama et al. .......... 382/284
6,044,180 A *  3/2000 Brandestini et al. ........ 382/274
6,094,217 A *  7/2000 Nishimura .................... 348/96
6,160,643 A * 12/2000 Deschuytere et al. ....... 358/504
6,462,835 B1* 10/2002 Loushin et al. .............. 358/1.9
6,466,337 B1* 10/2002 Suhr et al. ................... 358/446
6,473,535 B1* 10/2002 Takaoka ....................... 382/274
6,501,087 B1* 12/2002 Koretsune et al. .......... 250/566

* cited by examiner

*Primary Examiner*—Thomas D. Lee
*Assistant Examiner*—Heather D Gibbs
(74) *Attorney, Agent, or Firm*—Sughrue Mion, PLLC

(57) ABSTRACT

An image reading apparatus and method are provided which precisely correct shading due to dispersion of the spectral sensitivity characteristic of a reading area of a reading device. Second correction values for correcting, for each of R, G and B, shading due to partial dispersion of spectral characteristics of color separation filters are respectively set and stored for each film type and for each of a plurality of blocks forming an image, on the basis of results of reading a film for correction value setting. Then, from the stored second correction values, correction values corresponding to a type of a film which is an object of reading are retrieved to derive correction values for each pixel by interpolation. The derived correction values for each pixel are added to first correction values for correcting shading due to irregularity in the amount of light or the like.

28 Claims, 21 Drawing Sheets

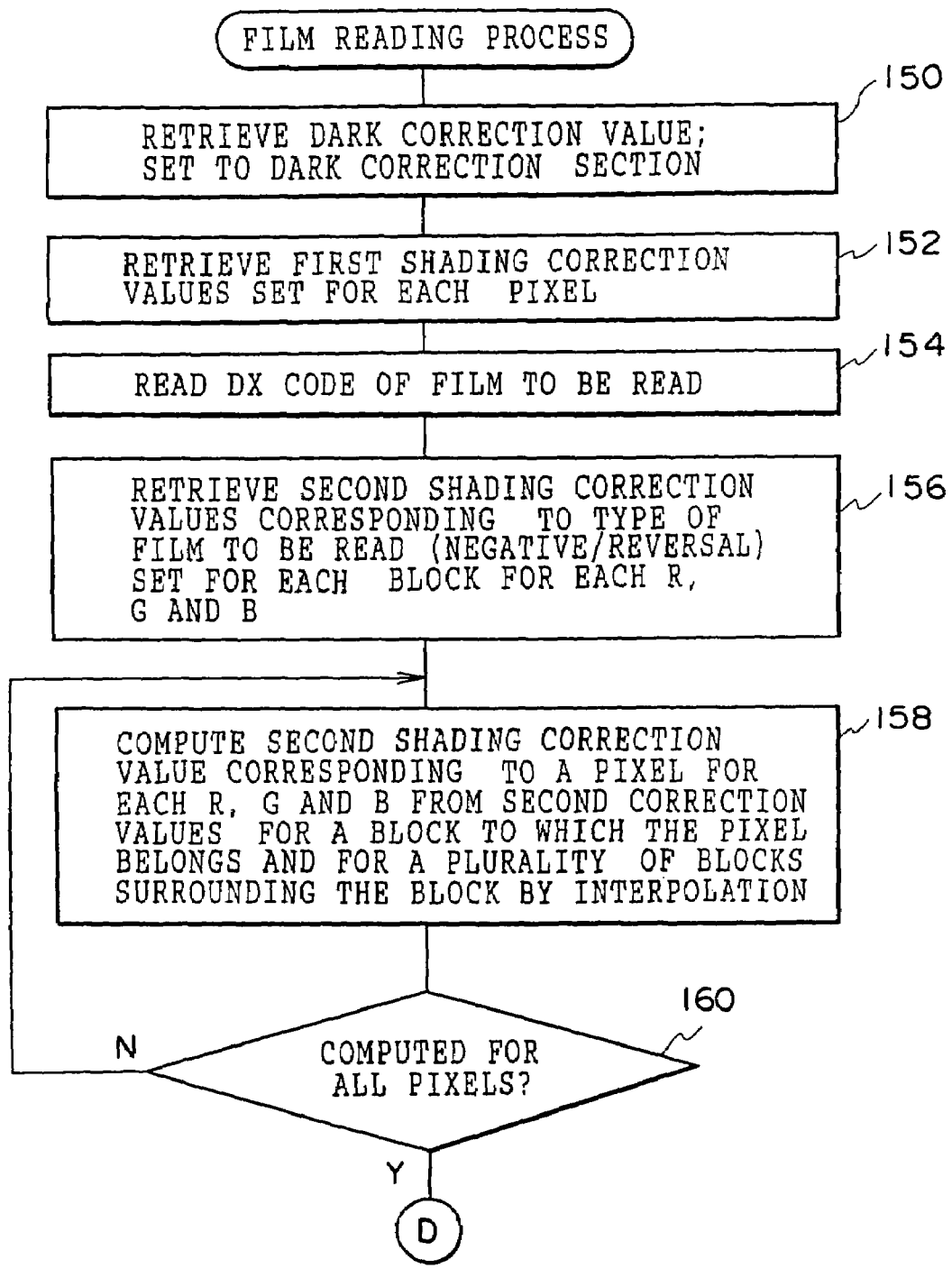

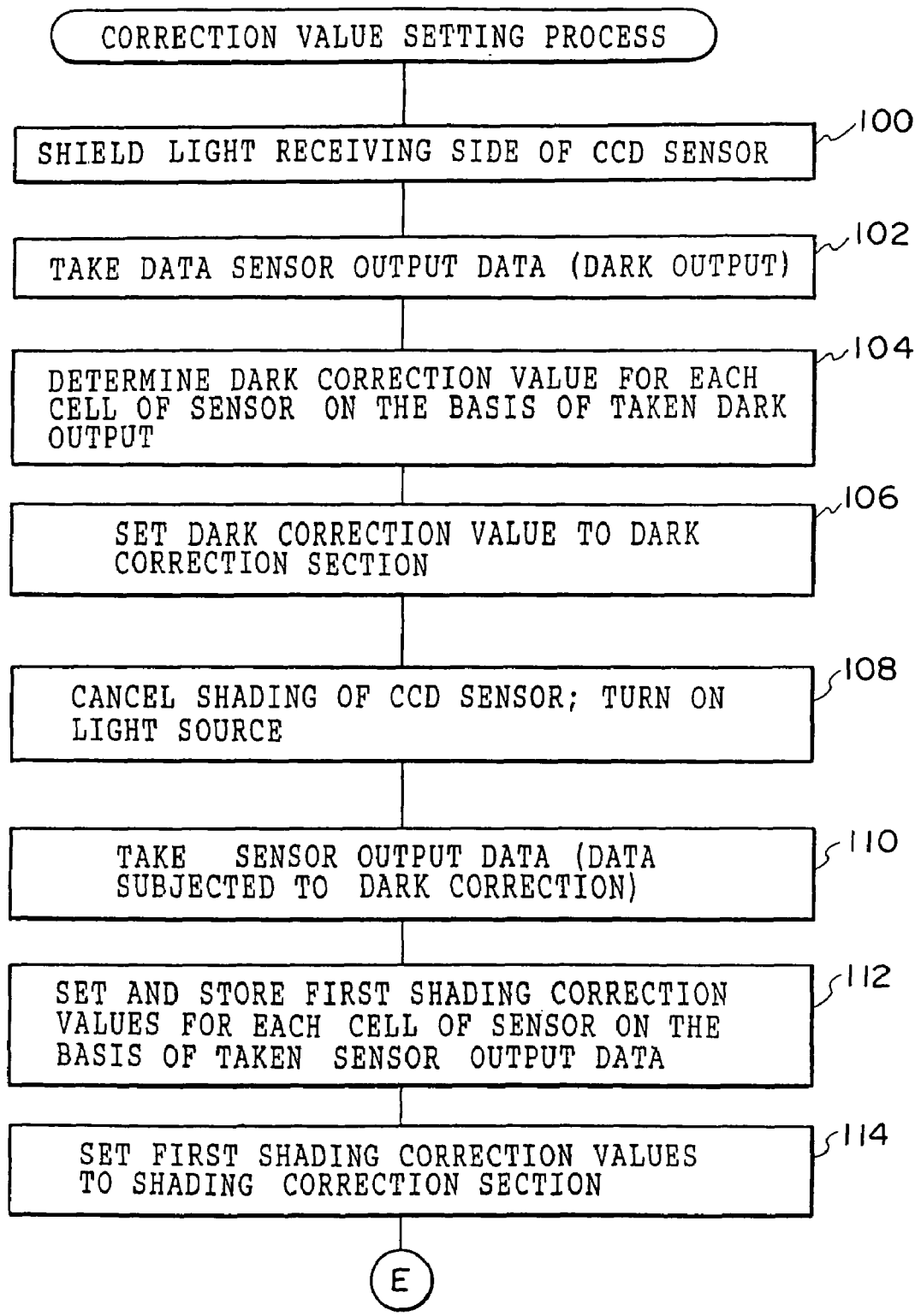

IMAGE READING APPARATUS AND METHOD

BACKGROUND OF THE INVENTION

1. Field of the Invention

The present invention relates to an image reading apparatus and a method for reading an image, and particularly to an image reading apparatus which reads an original such as a photographic film by using light transmitted through or reflected from the original, and a method which is applicable to the image reading apparatus.

2. Description of the Related Art

A conventional image reading apparatus is known which obtains image data representing an original by irradiating light emitted from a light source section onto the original such as a photographic film, making the light transmitted through or reflected from the original incident on a reading sensor formed by a CCD sensor or the like through a focusing lens or the like, and converting analog signals output from the reading sensor into digital data. In an image reading apparatus of this type, even when no image is set, the amount of light incident on the reading sensor through the focusing lens generally varies. For example, the amount of light incident on a peripheral portion of the light-receiving surface of the reading sensor is lower than that incident on a central portion of the light-receiving surface due to irregularity in the amount of light emitted from a light source section or aberration of the focusing lens or the like. Further, there is dispersion in the sensitivities of the respective photoelectric conversion cells of the reading sensor.

An image represented by signals, which are output from photoelectric conversion cells of a reading sensor at a time of image reading, has shading such as unevenness in density caused by the above described irregularity of amounts of light due to the light source, the lens, or the like, or caused by the above-described dispersion in sensitivities of the photoelectric conversion cells. Therefore, conventionally, in order to obtain signals which are equivalent to those signals which are generated by precisely reading an original, so-called shading correction (also referred to as a light correction) has been performed (for example, see Japanese Patent No. 2556486 and the like). In this shading correction, a gain (a correction value) for a signal output from each of the photoelectric conversion cells is obtained on the basis of the signal output from each photoelectric conversion cell of the reading sensor in accordance with light from the light source in a state in which no original is set, and the signal is corrected for each cell by using the obtained gain.

An image reading apparatus which reads a color original is generally structured to have a color separation device such as color separation filters or a dichroic mirror which is disposed at a light receiving side of a reading sensor and separates incident light into a plurality of color components (such as R, G and B). Light of one of the color components which has been separated by the color separation device is incident on the light-receiving surface of the reading sensor. When the entire surfaces of the color separation filters disposed at the light receiving side of the reading sensor are not precisely and evenly made, for example, due to production error, or when there is slight dispersion in the angles of incidence of light onto different portions of the dichroic mirror, the spectral characteristic of the color separation device vary along a direction perpendicular to the optical axis of the incident light.

Therefore, the spectral characteristic of the reading device, including the color separation device and the reading sensor, varies at respective portions of a reading area of the reading device (for example, the wavelength corresponding to the peak of the spectral characteristic varies), and this results in shading such as irregularity of color in an image represented by signals output from each of the photoelectric conversion cells of the reading sensor. The intensity and the like of the above shading differ depending on the relationships between the spectral sensitivity characteristic of the reading device and the spectral absorption characteristic of a coloring material (such as a coupler for a photographic film or an ink for a printed image) of an original. (Hereinafter, this latter characteristic is simply referred to as "spectral absorption characteristic of an original".)

FIGS. 1A and 1B show (exemplary) spectral absorption characteristics wherein the vertical axis represents light transmittance (or reflectance). For example, when an original has the spectral absorption characteristic represented by the solid line of FIG. 1A, and a wavelength range of the spectral sensitivity characteristic of a reading device, which should have been the spectral sensitivity characteristic represented by the broken line of FIG. 1A, is shifted at the peripheral portions and the like of a reading area as represented by the alternate long and short dashed line of FIG. 1A due to dispersion of the spectral sensitivity characteristic of the reading device, shading occurs at the peripheral portions and the like of the reading area in accordance with the difference between the spectral absorption characteristic of the original within the wavelength range of the spectral sensitivity characteristic represented by the broken line and the spectral absorption characteristic of the original within the wavelength range of the spectral sensitivity characteristic represented by the alternate long and short dashed line. Thus, the intensity and the like of shading differ in accordance with the spectral absorption characteristic of an original (in this case, the difference between the spectral absorption characteristic of the original in the two wavelength ranges).

SUMMARY OF THE INVENTION

In view of the aforementioned, an object of the present invention is to provide an image reading apparatus and a method for reading an image which are able to perform precise correction of shading due to dispersion of the spectral sensitivity characteristic within a reading area of a reading device.

In order to accomplish the above described object, an apparatus for reading an image relating to a first aspect includes: (a) a reading device having a plurality of photoelectric conversion cells, which receive light transmitted through or reflected from an original, and produce electronic information representing the image as a plurality of pixels; and (b) a data processing system electronically connected to the reading device and receiving the electronic information therefrom, the data processing system including a memory and logic, the logic defining the electronic information as being divided into a plurality of areas, with each area including a plurality of the pixels, and corrects for reading discrepancies in the reading device by applying data correction values to the electronic information corresponding to each area, with the data correction values stored in the memory, and previously obtained by reading a predetermined image of at least one type corresponding or similar to the original.

A second aspect of the present invention is the apparatus of the first aspect, wherein the predetermined image of the type corresponding or similar to the original has a spectral absorption characteristic approximate to that of the original.

A third aspect of the present invention is the apparatus of the first aspect, wherein the reading device includes at least one type of color filter for producing electronic image information corresponding to a plurality of color separated components, wherein there are data correction values stored in the memory for each of the color components, and the logic applies data correction values in accordance with each of the color components to the electronic information representing the original.

A fourth aspect of the present invention is the apparatus of the third aspect, wherein the reading device is configured to read the original by separating the original into a plurality of color components using a color separation filter, and dispersion of the spectral absorption characteristic in a reading area of the reading device is caused at least by dispersion of a characteristic of the color separation filter in the reading area of the reading device.

A fifth aspect of the present invention is the apparatus of the fourth aspect, wherein the reading device is a line sensor provided with the color separation filter.

A sixth aspect of the present invention is the apparatus of the first aspect, further including a light source section including a plurality of point light sources or line light sources, wherein the reading device reads the original by using light emitted from the light source section and transmitted through or reflected from the original.

A seventh aspect of the present invention is the apparatus of the first aspect, further including a light source section including LEDs as light emitting sources, wherein the reading device reads the original by using light emitted from the light source section and transmitted through or reflected from the original.

A eighth aspect of the present invention is the apparatus of the first aspect, wherein the original is a photographic film, and the predetermined original is a photographic film corresponding or similar to the photographic film of the original, exposed to an amount of light corresponding to an amount of gray in the original.

A ninth aspect of the present invention is the apparatus of the first aspect, wherein the original is a photographic film including a code recorded on the film, or the original is a photographic film accommodated in a cartridge with the code recorded on the cartridge, and the reading device reads the code and produces electronic information corresponding to the code, and the information processing system receives the electronic information corresponding to the code and retrieves from the memory, data correction values for a photographic film corresponding to that code.

A tenth aspect of the present invention is the apparatus of the first aspect, further including a user input device electronically connected to the information processing system, for entering information identifying the original type, which is received by the information processing system, and the logic retrieves from the memory data correction values corresponding or similar to that type.

A eleventh aspect of the present invention is the apparatus of the first aspect, wherein the data correction values corresponding to the areas, correspond to a plurality of regions forming each area, with the quantity of regions forming each area being less than the quantity of pixels forming that area, and the logic determines a correction for each pixel in that area by interpolation.

A twelfth aspect of the present invention is the apparatus of the first aspect, wherein the predetermined original includes areas of different image densities, and the logic applies the data correction values to the electronic information received for the original based on density of data.

A thirteenth aspect of the present invention is a method for reading an original with an image reading device having a plurality of photoelectric conversion cells, the method including: (a) providing a predetermined image of a type the same or similar to that of the original; (b) using the image reading device to read the predetermined image and produce electronic information representing the predetermined image; (c) determining data correction values for use with electronic information representing the original based on the electronic information representing the predetermined image; (d) using the image reading device to read the original and produce electronic information representing the original; and (e) correcting the electronic information representing the original by applying the data correction values.

BRIEF DESCRIPTION OF THE DRAWINGS

FIGS. 5A and 5B are flow charts showing a film reading process relating to the first embodiment.

FIGS. 7A to 7C are flowcharts showing a correction value setting process relating to a second embodiment.

DESCRIPTION OF THE PREFERRED EMBODIMENTS

Referring to the figures, an example of embodiments of the present invention is explained in detail below.

First Embodiment

Figure 1A:
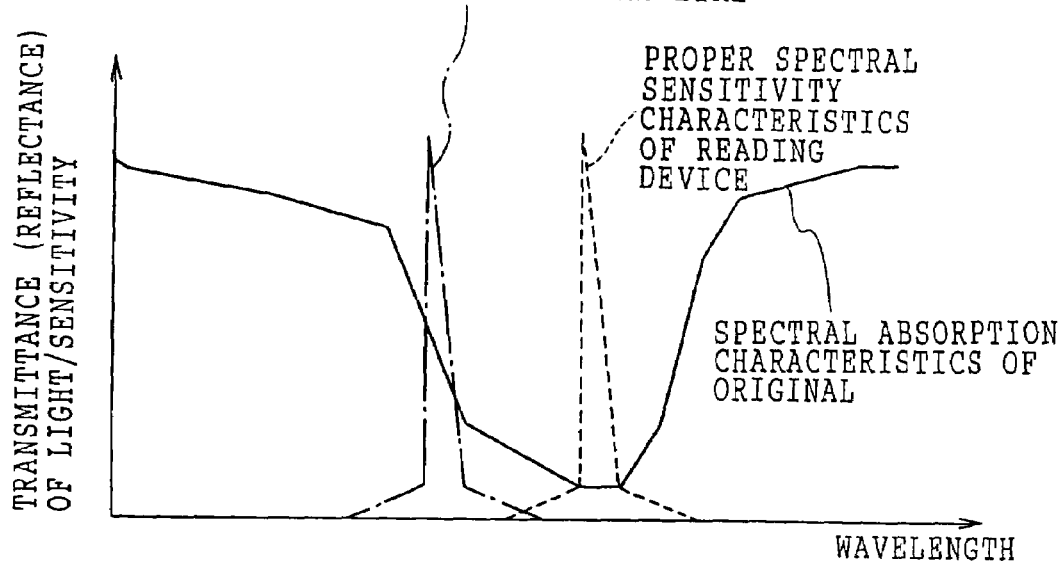
FIGS. 1A and 1B are diagrams for explaining development of shading due to shift of a wavelength range of the spectral sensitivity characteristic of a reading device.
Figure 1B:
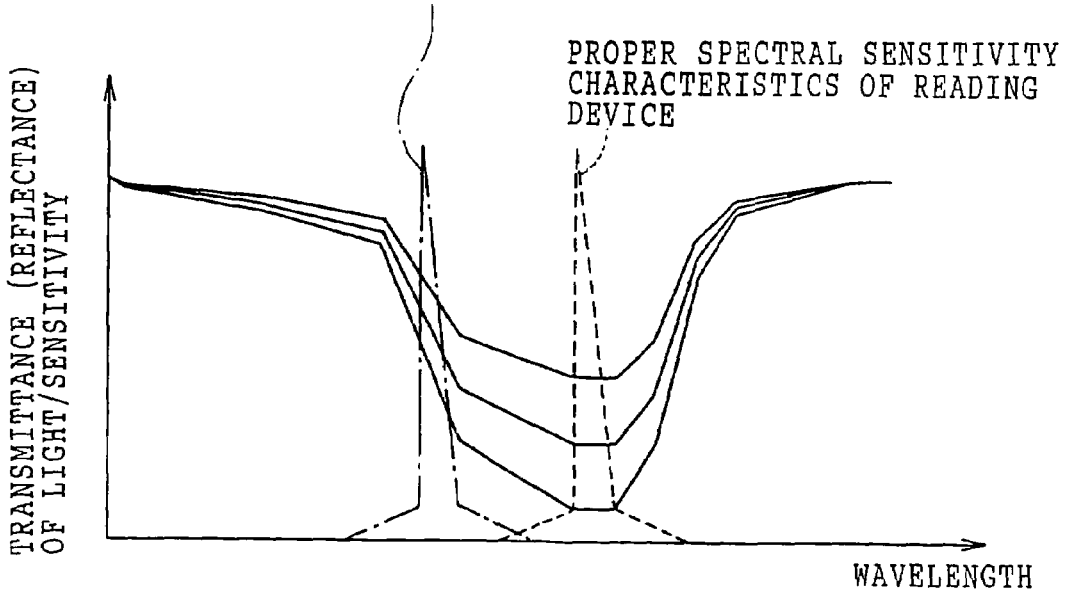
Figure 2:
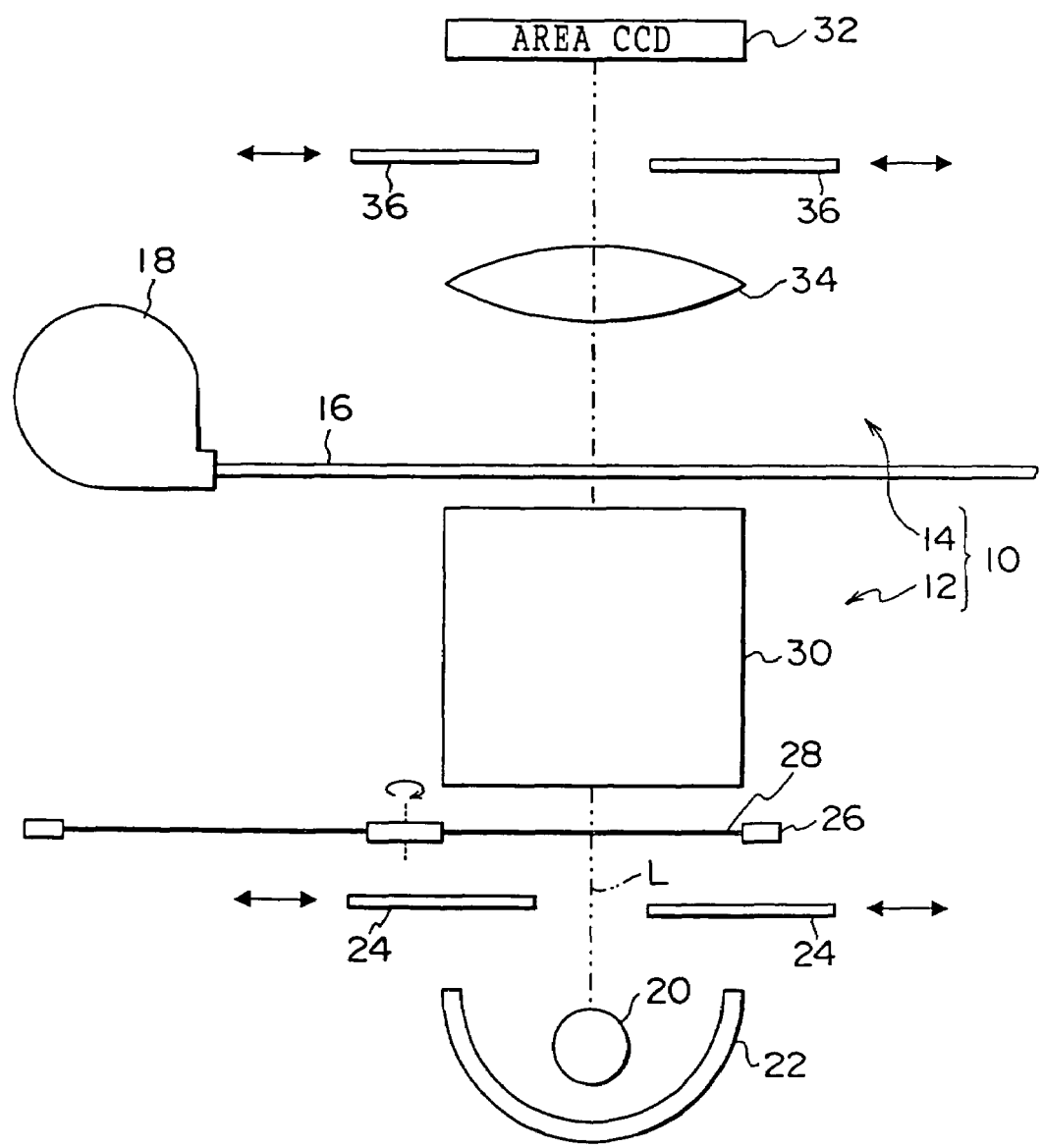
FIG. 2 is a side view showing a schematic structure of an optical system of a film scanner relating to present embodiments.

FIG. 2 shows a schematic structure of an optical system of a film scanner 10 as an image reading apparatus relating to the present invention. The optical system of the film scanner 10 is provided with a light source section 12 and a reading section 14 which is disposed so as to face the light source section 12 via a photographic film 16.

The light source section 12 is provided with a lamp 20 such as a halogen lamp or the like. A reflector 22 is provided around the lamp 20, so that a portion of the light emitted from the lamp 20 is reflected by the reflector 22 and emitted in a predetermined direction. At a light emitting side of the reflector 22, along an optical axis L of the light emitted from the reflector 22, a UV/IR cut filter (not shown) which cuts light of wavelengths of ultraviolet region and of infrared region, a diaphragm 24 for adjusting an amount of light irradiated onto the photographic film 16, a turret 26, and a light diffusion box 30 which diffuses light irradiating the photographic film 16 are provided in sequence. The diaphragm 24 is driven by a diaphragm driving section 56 (see FIG. 3).

Color separation filters 28 for three color components (R, G and B) are respectively fit into a plurality of openings of the turret 26, and one of the color separation filters 28 is selectively positioned on the optical axis L as the turret 26 rotates. The turret 26 is rotated so that each of the color separation filters for respective color component is sequentially positioned on the optical axis L. The reading section 14 (details are described later) can read a film image recorded on the photographic film 14 for each color component by reading the image in a state in which each of the color separation filters 28 is positioned on the optical axis L.

Figure 3:
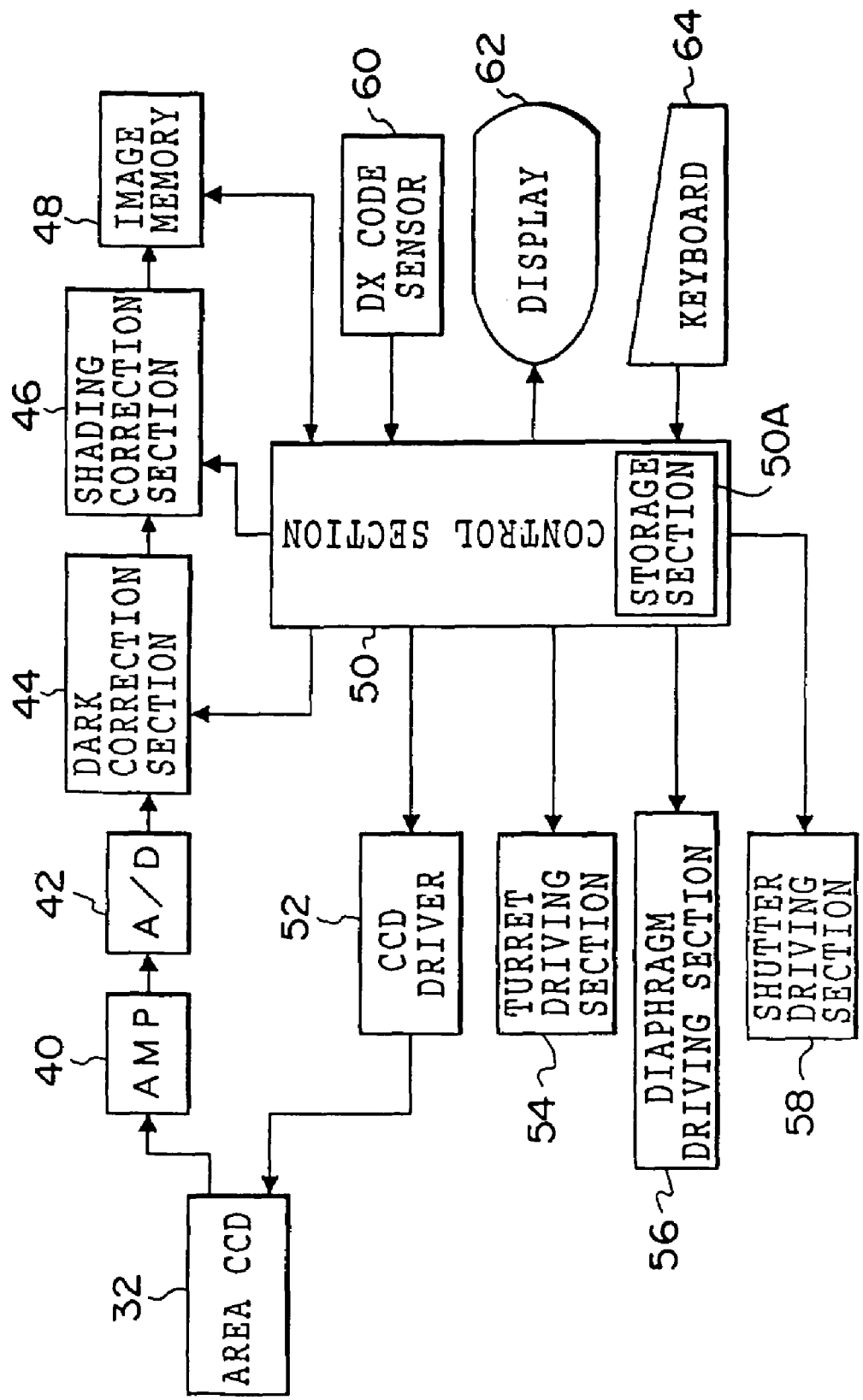
FIG. 3 is a block diagram showing a schematic structure of a signal processing system and a control system of the film scanner.

The turret 26 is rotatably driven by a turret driving section 54 (see FIG. 3). Further, the turret 26 is also provided with an opening, into which no color separation filter 28 is fit.

A film carrier (not shown) which pulls out and conveys the photographic film 16 from a cartridge containing the photographic film 16 is provided above the diffusion box 30. A plurality of film images are recorded on the photographic film 16 along a longitudinal direction thereof, and the photographic film 16 pulled out from the cartridge 18 is conveyed stepwise so that each of the recorded film images is sequentially positioned in a state in which an image center of a film image coincides with the optical axis L. Further, a DX code sensor 60 (see FIG. 3) which detects DX codes recorded on the photographic film 16 is provided to this film carrier.

The reading section 14 is provided with a monochromatic area CCD 32. Further, a lens 34, which focuses the light transmitted through a film image on a light-receiving surface of the area CCD 32, and a shutter 36, which shields the incident light onto the area CCD 32 when later described dark correction values are set, are disposed in sequence between the photographic film 16 and the area CCD 32, along the optical axis L. The light which has transmitted through the photographic film 16 (a film image) transmits through the lens 34, passes through a position, at which the shutter 36 is disposed, and enters the area CCD 32. The shutter 36 is driven by a shutter driving section 58 (see FIG. 3).

Specifically, the area CCD 32 is formed of a number of photoelectric conversion cells, which includes CCD cells, photodiodes or the like, and have a function of photoelectrically converting and accumulating incident light as a charge, arranged in a line along a predetermined direction to form a sensing section, a number of the sensing sections being arranged along a direction perpendicular to the predetermined direction. Further, the area CCD 32 is provided with an electronic shutter mechanism which uniformly controls charge accumulation time of all the photoelectric conversion cells. In the vicinity of each of the sensing sections, a transfer section formed of a number of CCD cells is provided correspondingly to each of the sensing sections, and a charge accumulated in each of the CCD cells of each of the sensing sections (an amount of the charge represents a integrated value of an amount of incident light within a charge accumulation time) is sequentially transferred outside via the corresponding transfer section.

As shown in FIG. 3, an amplifier 40, an A/D converter 42, a dark correction section 44, a shading correction section 46 and an image memory 48 are serially connected to a signal output terminal of the area CCD 32. Signals output from the area CCD 32 are amplified at the amplifier 40, converted into digital data at the A/D converter 42, subjected to a dark correction by the dark correction section 44 as well as a shading correction by the shading correction section 46, and stored in the image memory 48. The image memory 48 is connected to a control section 50 which includes a micro computer or the like and is provided with a storage section 50A formed of a non-volatile memory or the like. The storage section 50A corresponds to storage means relating to the present invention.

The turret driving section 54 is connected to the control section 50. The control section 50 sets a target rotating position of the turret 26 to the turret driving section 54, and the turret driving section 54 rotatably drives the turret 26 so that the turret 26 rotates to the instructed target rotating position. Further, the diaphragm driving section 56 and the shutter driving section 58 are connected to the control section 50. The control section 50 sets a target moving position of the diaphragm 24 to the diaphragm driving section 56, and when dark correction values are set, instructs shading by the shutter 36 to the shutter driving section 58. The diaphragm driving section 56 drives the diaphragm 24 so that the diaphragm 24 moves to the target moving position, and when shading is instructed, the shutter driving section 58 drives the shutter 36 to shield the incident light to the area CCD 32.

The control section 50 is connected to the area CCD 32 via a CCD driver 52. The control section 50 sets a charge accumulation time of the area CCD 32 for film image reading to the CCD driver 52, and the CCD driver 52 controls operation of the area CCD 32 so that the area CCD 32 reads a film image for a set charge accumulation time.

Further, the DX code sensor 60, the dark correction section 44 and the shading correction section 46 are respectively connected to the control section 50. The control section 50 identifies the film type of the photographic film 16 set in the film scanner 10 on the basis of a signal representing a results of DX code detection input from the DX code sensor 60. The control section 50 determines dark correction values for use in a dark correction as well as the shading correction values for use in the shading correction, and sets the determined dark correction values at the dark correction section 44, and the determined shading correction values at the shading correction section 46 (details are described later).

A display 62 (either LCD or CRT) for displaying various information and a keyboard 64 for an operator to input information are also connected to the control section 50.

Figure 4A:
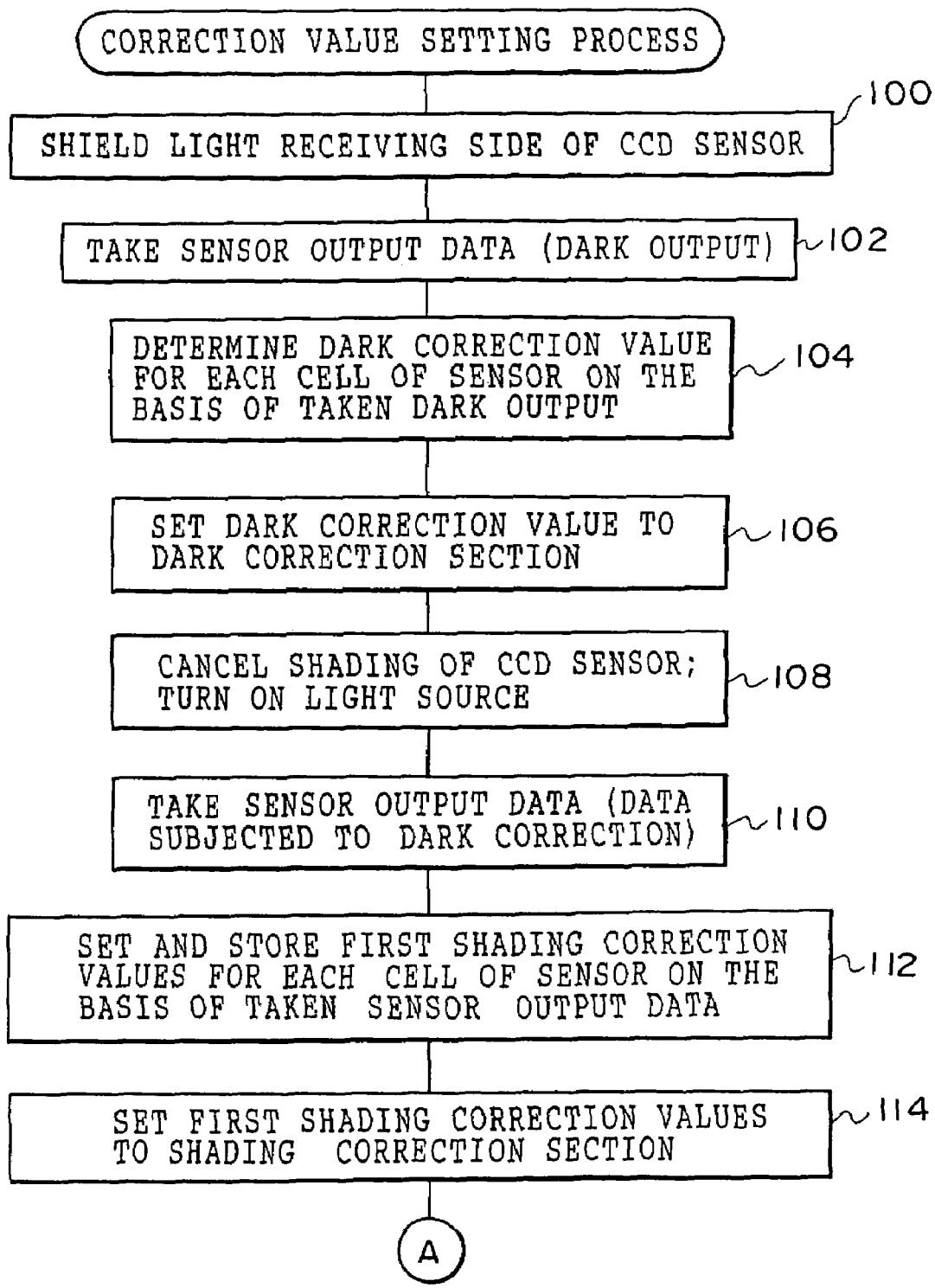
FIG. 4A to 4C are flow charts showing a correction value setting process relating to a first embodiment.
Figure 4B:
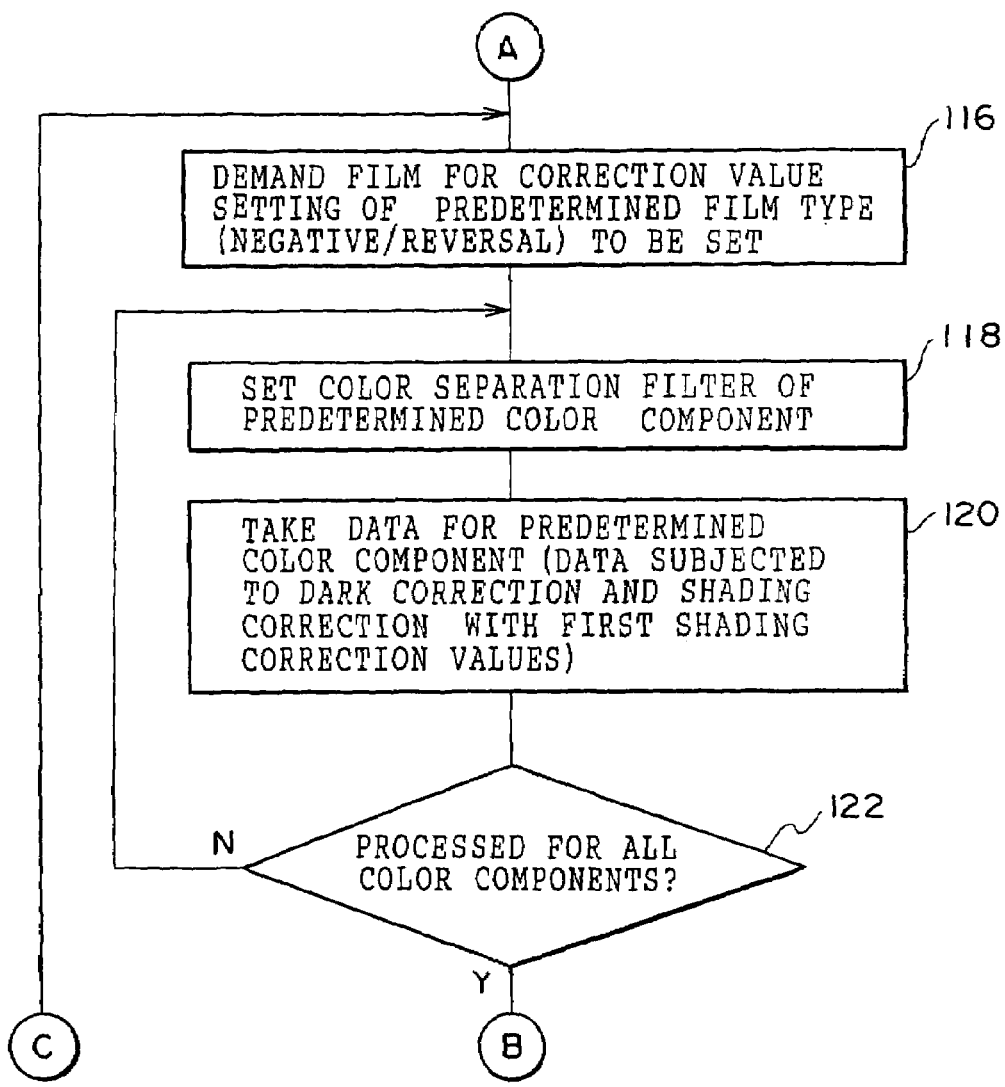
Figure 4C:
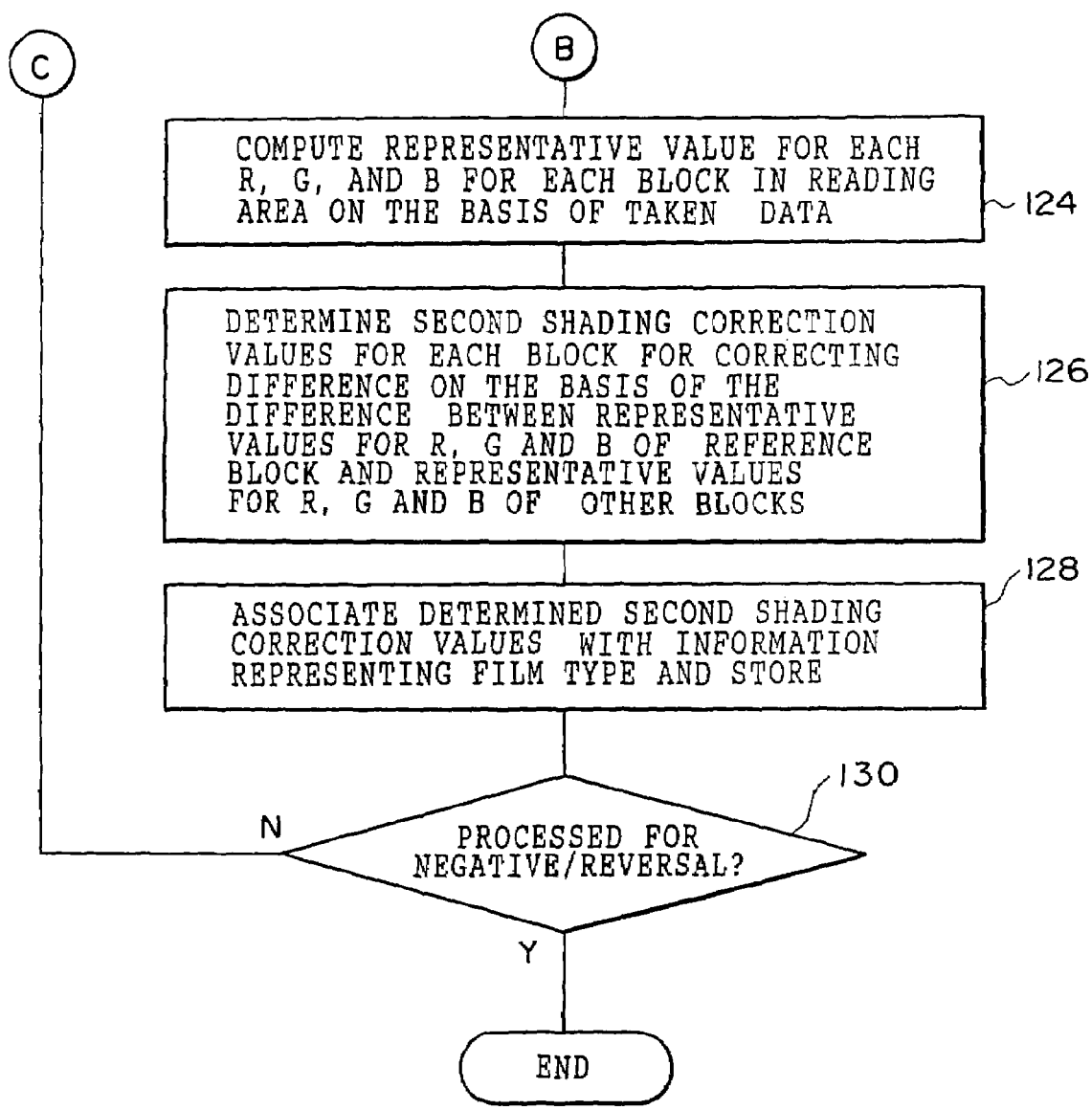

Next, as operation of the present first embodiment, with reference to the flow chart of FIG. 4, a correction value setting process which is carried out prior to reading of a film image is explained first.

In step 100, in order to set dark correction values, the shutter 36 is moved via the shutter driving section 58 so that the incident light into the area CCD 32 is shielded by the shutter 36. Next, in step 102, the dark correction at the dark correction section 44 and the shading correction at the shading correction section 46 are stopped (input data is passed without being processed), and the data, which has been output from the area CCD 32, amplified at the amplifier 40, A/D converted at the A/D converter 42, passed through the dark correction section 44 and the shading correction section 46 without being processed, and stored in the image memory 48, (data corresponding to dark output of signals output from each of the photoelectric conversion cells of the area CCD 32) is taken.

Next, in step 104, data Dj (j is a code for identifying each pixel corresponding to each photoelectric conversion cell of the area CCD 32) for each pixel (for each photoelectric conversion cell of the area CCD 32) which has been taken in step 102 is used as a correction value (a dark correction value Bj) for performing the dark correction (correction of dispersion of dark output of each photoelectric conversion cell of the area CCD 32). Then, in step 106, the dark correction value Bj is stored in the storage section 50A and is set at the dark correction section 44. Thus, the dark correction which subtracts the set dark correction value Bj from the data Dj input from the A/D converter 42 is carried out at the dark correction section 44.

Subsequently, in order to set correction values for the shading correction, in step 108, the shutter 36 is moved via the shutter driving section 58 so that the shielded state of the incident light into the area CCD 32 is cancelled, the lamp 20 of the light source section 12 is turned on, and the turret 26 is rotatably driven by the turret driving section 54 so that the opening, which have no color separation filter 28 fitted therein, of the plurality of openings of the turret 26 is positioned on the optical axis L.

In step 110 next, data Ej which has been subjected to the dark correction at the dark correction section 44, passed through the shading correction section 46 without being processed and stored in the image memory 48 (the data subjected to the dark correction) is taken. The data Ej subjected to the dark correction has irregularity (shading) in values of each pixel corresponding to each of the photoelectric conversion cells of the area CCD 32 due to irregularity in the amount of emitted light from the light source section 12, aberration of the lens 34 and the like.

Therefore, in step 112 next, first shading correction values S1j for correcting shading due to the aforementioned irregularity of the amount of light is determined for each of the photoelectric conversion cells of the are CCD 32, on the basis of the data Ej taken in step 110. Then, in step 114, the determined first shading correction values S1j are stored in the storage section 50A and are set at the shading correction section 46. At the shading correction section 46, the data input from the dark correction section 44 is corrected using the first shading correction values S1j, thereby correcting shading due to uniformity of the amount of light and the like (this correction is referred to as "first shading correction" herein).

In step 116 next, a message which demands a film for correction value setting of a predetermined type to be set at the film scanner 10 is displayed on the display 62, to make an operator to set the film for correction value setting. In the present first embodiment, two types of films, i.e. a negative film and a reversal film are prepared as films for correction value setting. The films for correction value setting correspond to a predetermined image relating to the present invention.

As a negative film for correction value setting, of various types of negative films, a negative film of a first predetermined film type which is most frequently brought as a film to be read (most frequently read by the film scanner 10) is used, and the negative film for correction value setting is prepared by exposing the negative film with a certain amount of light which is corresponding to an amount of gray of an object, and performing processing such as development on the negative film. Thus, on the negative film for correction value setting, a portion colored in gray according to the spectral absorption characteristic of a color forming coupler of the negative film of the first predetermined film type is formed.

As a reversal film for correction value setting, as similar to the negative film for correction value setting, of various types of reversal films, a reversal film of a second predetermined film type which is most frequently brought as a film to be read (most frequently read by the film scanner 10) is used, and the reversal film for correction value setting is prepared by exposing the reversal film with a certain amount of light which is corresponding to an amount of gray of an object, and performing a processing such as development on the reversal film. Thus, on the reversal film for correction value setting, a portion colored in gray according to the spectral absorption characteristic of a color forming coupler of the reversal film of the second predetermined film type is formed.

As the negative or reversal film for correction value setting is set in the film scanner 10, the turret 26 is rotatably driven by the turret driving section 54 in step 118 so that one of the color separation filters 28 of a predetermined color component (such as R) is positioned on the optical axis L. Then, in step 120, data Fxj (x represents either one of r, g and b) which has been subjected to the dark correction at the dark correction section 44 and the first shading correction at the shading correction section 46, and stored in the image memory 48 (data subjected to the dark correction and the first shading correction) is taken.

Then, in step 122, whether the above described process has been performed for all the color components or not is determined. If the determination is negative, the process returns to step 118 to repeat steps 118 and 120 for an unprocessed color component (such as G or B). Thus, data Frj, Fgj and Fbj for the color components R, G and B which have been subjected to the dark correction and the first shading correction are respectively collected.

Spectral characteristics of the color separation filters 28 for R, G and B which are fit into the openings of the turret 26 are partially non-uniform due to production error and the like, and the spectral sensitivity characteristic in a reading area of a reading device formed of the color separation filters 28 and the area CCD 32 are also non-uniform. Therefore, R, G and B data which have been subjected to the dark correction and the first shading correction have irregularity (shading) in values of each pixel corresponding to each of the photoelectric conversion cells of the area CCD 32 due to the dispersion of the spectral sensitivity characteristic of the reading device.

Since this shading due to the dispersion of the spectral sensitivity characteristic of the reading device varies in intensity and the like according to relationships between the spectral sensitivity characteristic of the reading device and the spectral absorption characteristic of the color forming coupler of the photographic film to be read, second shading correction values for a negative or reversal film is set as correction values for correcting shading due to the dispersion of the spectral sensitivity characteristic of the reading device (second shading correction values) according to the type of the film for correction value setting which is set in the film scanner 10.

Figure 6A:
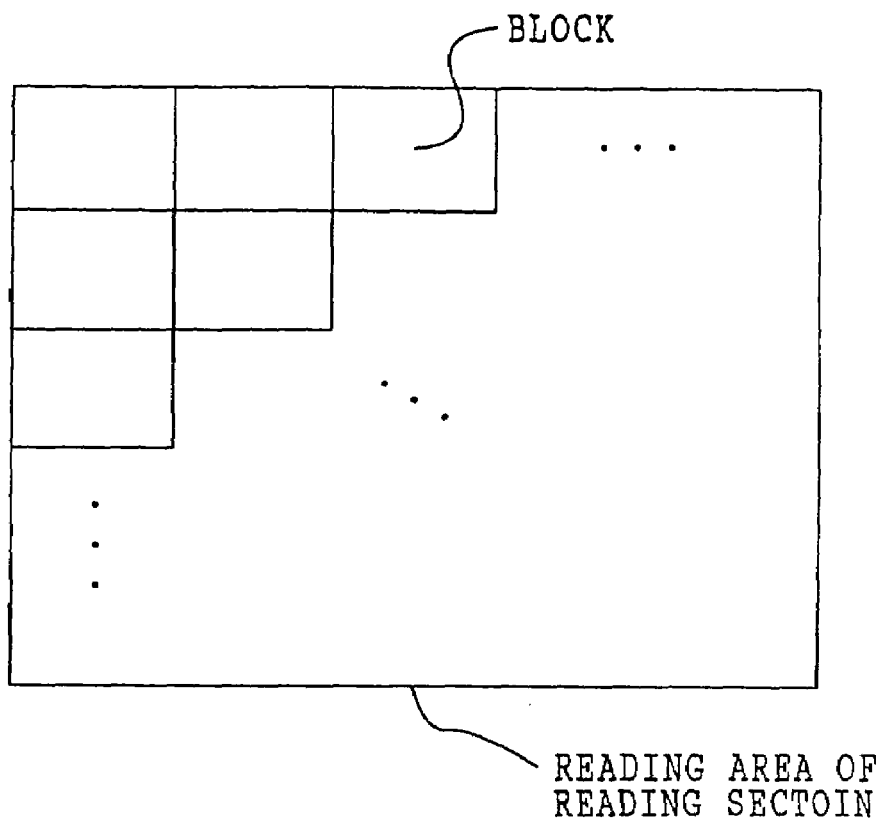
FIG. 6A is a conceptual diagram for explaining how a reading area is divided into a plurality of blocks.

That is, in step 124, a reading area of the area CCD 32 (a reading area of the reading device) is divided into a plurality of (such as 32 by 32) of blocks (partial region) as shown in FIG. 6A, and representative values Lri, Lgi and Lbi (i is a code for identifying each block) are computed for each block on the basis of the data Frj, Fgj and Fbj taken in the step 120. An average or a median for each of R, G and B of the data of each of the pixels forming a single block can be used as the representative values Lri, Lgi and Lbi.

Next, in step 126, differences between representative values L r ref, L g ref and L b ref of a predetermined reference block and representative values Lri, Lgi and Lbi of other blocks of a plurality of blocks are computed for each block, and the second shading correction values for correcting the differences between the representative values are set for each block. The second shading correction values LASri, LASgi and LASbi of a block i can be obtained, for example, as follows:

$$LASri \leftarrow L\ r\ ref-Lri\ LASgi \leftarrow L\ g\ ref-Lgi\ LASbi \leftarrow L\ b\ ref-Lbi$$

Then, in step 128, the second shading correction values determined for each block are associated with information representing the type of the film (negative or reversal) and stored in the storage section 50A. The second shading correction values stored in the storage section 50A correspond to correction values relating to the present invention.

In step 130 next, whether the second correction values for a negative film and a reversal film have been respectively set or not is determined. If the determination is negative, the process returns to step 116 to perform the actions in step 116 and following steps on a film for which the second shading values have not yet been set. Thus, the second shading values are set and stored respectively for a negative film and a reversal film.

Figure 5B:
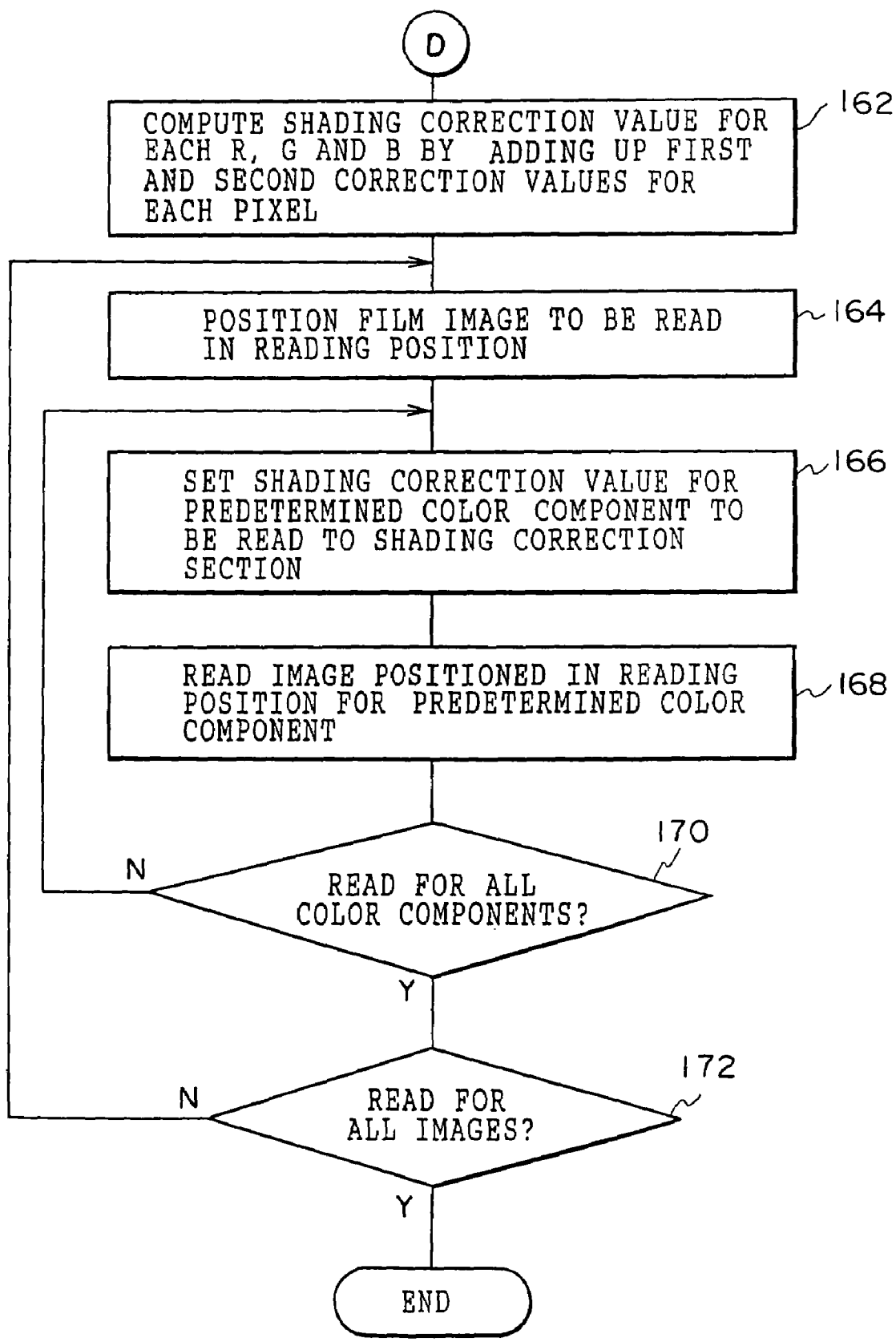

Next, referring to the flow charts in FIGS. 5A and 5B, a film reading process which is carried out for reading film images recorded on the photographic film 16 is explained. This film reading process is carried out in a state in which the photographic film 16 to be read is set in the film scanner 10.

In step 150, the dark correction value Bj is retrieved from the storage section 50A and is set at the dark correction section 44. In step 152, the first shading correction values S1j are retrieved from the storage section 50A. In step 154, reading of a DX code recorded on the photographic film 16 to be read is instructed to the DX code sensor 60, and the result of the DX code reading is taken. In step 156, on the basis of the result of the DX code reading, whether the photographic film to be read is a negative film or a reversal film is determined, and the second shading correction values (the second shading correction values LASri, LASgi and LASbi set for each block) associated with the type of the photographic film to be read is retrieved from the storage section 50A.

Then, in following steps 158 and 160, the second shading correction value S2xj for each of R, G and B for all the pixels respectively corresponding to photoelectric conversion cells of the area CCD 32 is computed on the basis of the second shading correction values for each block retrieved in step 156.

Figure 6B:
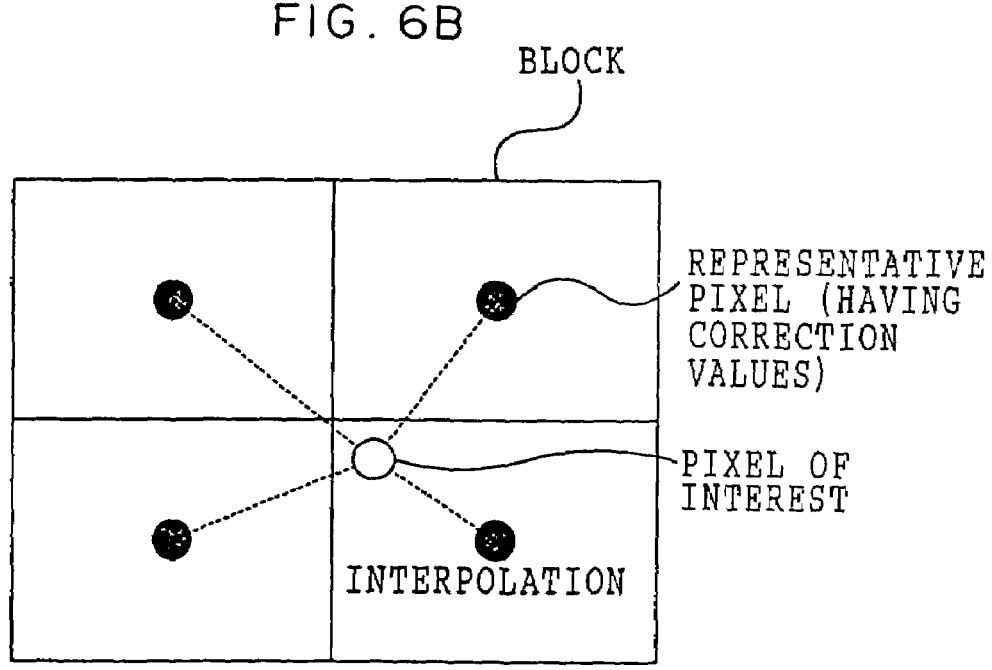
FIG. 6B is a conceptual diagram for explaining an interpolating computation of second shading correction values for each pixel from second shading correction values which have been set for each block.

That is, in step 158, as shown in FIG. 6B for an example, the second shading correction values set for a block in which a certain pixel (a pixel of interest) exists and for a plurality of blocks surrounding the block are regarded as the second shading correction values for a representative pixel located at the center of each block, and a weight is set for the second shading correction values of each block so that the larger the distance between the representative pixel and the pixel of interest is, the smaller the weight is. Then, the second shading correction value S2xj for each of R, G and B of the pixel of interest is derived from the second shading correction values for each block by an interpolating computation.

In step 160 next, whether all the pixels respectively corresponding to the photoelectric conversion cells of the area CCD 32 have been processed in step 158 or not is determined. If the determination in step 160 is negative, the process returns to step 158. Thus, the second shading correction values S2rj, S2gj and S2bj are respectively computed for all the pixels respectively corresponding to the photoelectric conversion cells of the area CCD 32.

If the determination in step 160 is affirmative, the process proceeds to step 162, where, the shading correction values Srj, Sgj and Sbj for the photographic film 16 to be read are obtained by adding the second shading correction values S2rj, S2gj and S2bj to the first shading correction values S1j for each pixel corresponding to each photoelectric conversion cell of the area CCD 32:

$$Srj \leftarrow S1j+S2rj\ Sgj \leftarrow S1j+S2gj\ Sbj \leftarrow S1j+S2bj$$

Once the computation of the shading correction values for the photographic film 16 to be read has been completed as described above, in step 164 next, the photographic film 16 to be read is conveyed by the film carrier and a film image recorded on the photographic film 16 is positioned in a reading position (a position in which the image center of the film image is positioned on the optical axis L).

In step 166, the turret 26 is rotatably driven via the turret driving section 54 so that one of the color separation filters 28 of a color component x is positioned on the optical axis L, and the shading correction value Sxj for the color component x is set at the shading correction section 46. Then, in step 168, the film image positioned in the reading position is read by the area CCD 32. Thus, the film image being positioned is read for the color component i, image signals output from the area CCD 32 are amplified by the amplifier 40, and A/D converted by the A/D converter 42, thereafter, subjected to the dark correction at the dark correction section 44 as well as to the shading correction at the shading correction section 46, and stored in the image memory 48 as image data.

Positioning of the diaphragm 24, charge accumulation time for each color component of the area CCD 32, and the like in the above described image reading (hereinafter, these are generally refereed to as "reading conditions") may be fixedly defined so that an accumulated charge at each cell of the area CCD 32 does not saturate even when density of a film image is very low (such as an underexposure negative image on a negative film), or the reading conditions may be adjusted for each film image depending on density of the film image and the like, on the basis of a preliminary reading of the film image (corresponding to a pre-scan in a second embodiment).

Next, in step 170, whether the film image positioned in the reading position has been read for all the color components or not is determined. If the determination is negative, the process returns to step 166 to repeat steps 166 through 170 until an affirmative determination is made in step 170. Thus, the film image positioned in the reading position is sequentially read for each color component, and the image data of the film image is stored in the image memory 48.

Since the image data stored in the image memory 48 has been subjected to the dark correction by the dark correction section 44 and the shading correction by the shading correction section 46 (specifically, the first shading correction and the second shading correction), the shading due to irregularity of dark output from each of the photoelectric conversion cells of the area CCD 32, irregularity in the amount of light emitted from the light source section 12, aberration of the lens 34 and the like has been corrected, and the shading due to dispersion of the spectral sensitivity characteristic of the reading device has been precisely corrected. Therefore, image data without shading which precisely represents a film image to be read can be obtained.

Steps 154 through 162 and step 166 in the above described process correspond to correcting means of the present invention.

If the determination in step 170 is affirmative, the process proceeds to step 172, where, whether all the film images recorded on the photographic film 16 to be read have been read or not is determined. If the determination is negative, the process returns to step 164 to position a next film image in the reading position, and the above described film image reading (steps 166 through 170) is repeated. When all the film images have been read, the film reading process ends.

Second Embodiment

Figure 7B:
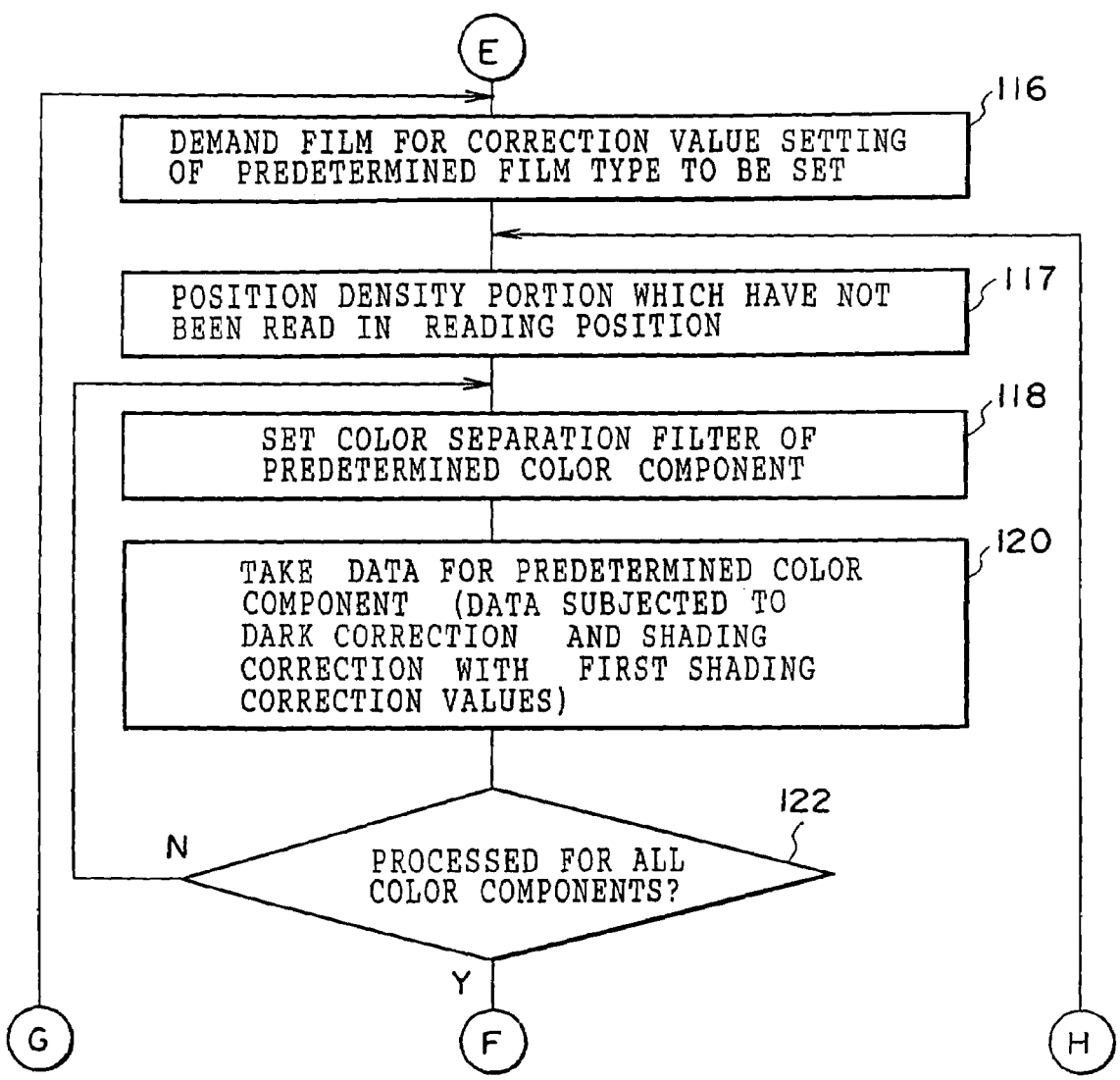
Figure 7C:
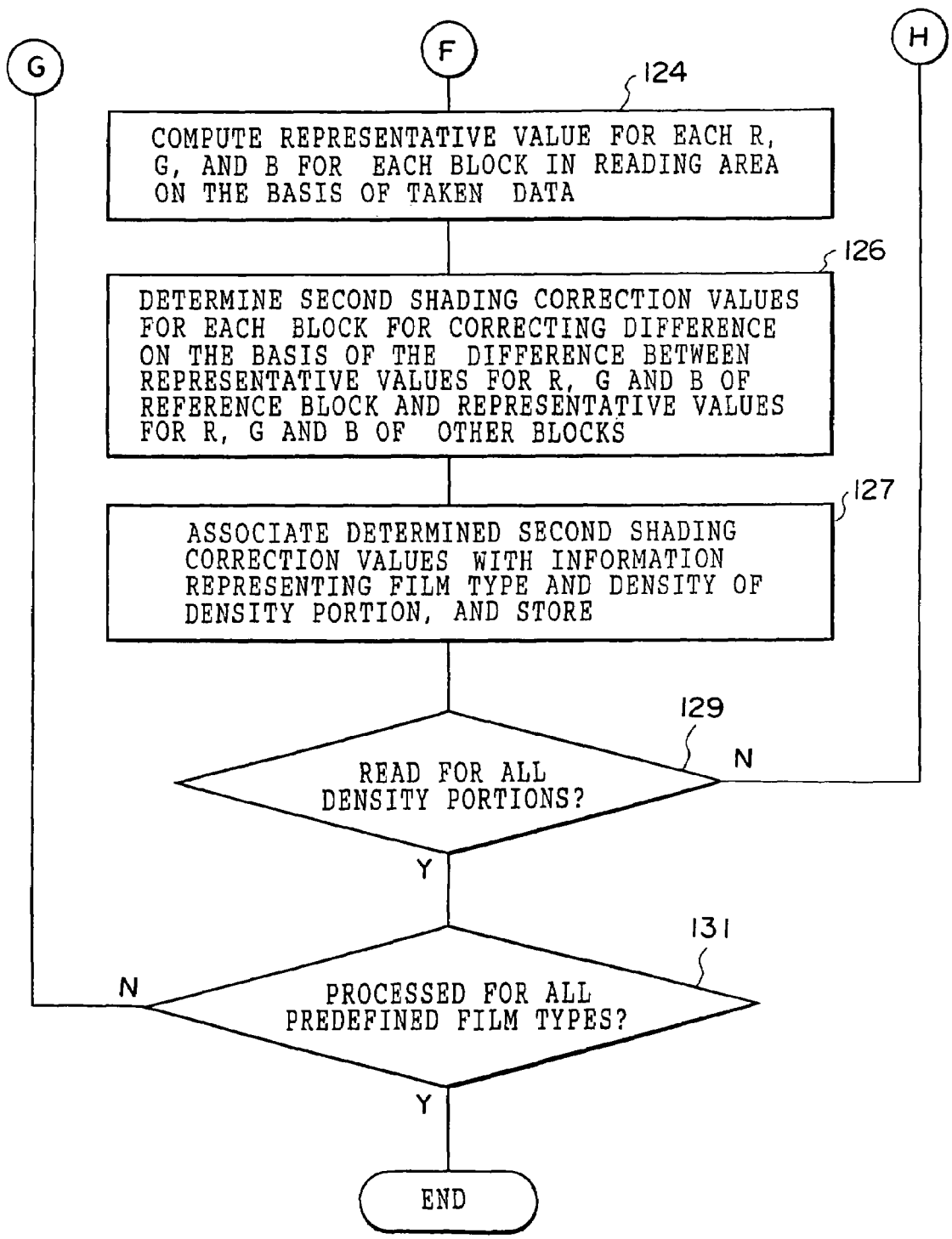

A second embodiment of the present invention is explained next. Since the present second embodiment has the same structure as the first embodiment, an explanation of the structure is omitted. As operation of the second embodiment, first, only portions of a correction value setting process relating to the second embodiment which are different from the correction value setting process explained in the first embodiment (FIG. 4) are explained below with reference to the flow chart of FIG. 7. In FIGS. 7A through 7C, the same reference numerals are assigned to steps which are the same as those in FIG. 4.

The correction value setting process relating to the present second embodiment sets second shading correction values respectively for a number of predefined film types. That is, after a dark correction value Bj and first shading correction values S1j are set (steps 100 through 114), an operator is demanded in step 116 to set a film for correction value setting of a predetermined film type (one of a number of predefined film types) in the film scanner 10.

Figure 10A:
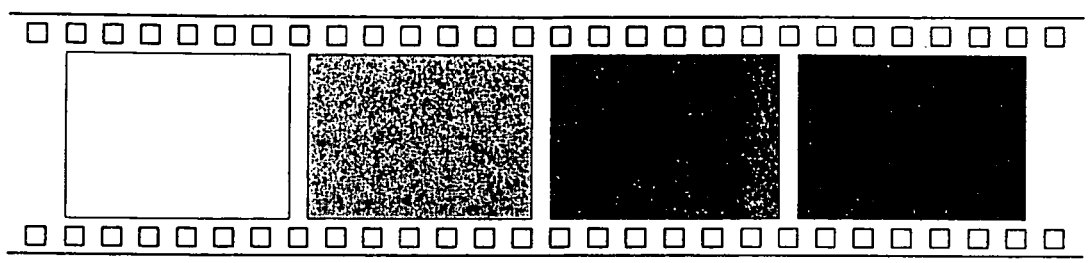
FIG. 10A is a plan view showing an example of a film for correction value setting relating to the second embodiment.

The film for correction value setting relating to the present second embodiment is prepared by exposing a film of a predetermined film type with light of certain amounts which are corresponding to an amount of gray of an object and differ each other, several times, and then performing processing such as development on the film. Thus, as shown in FIG. 10A as an example, on the negative film for correction value setting relating to the present second embodiment, a plurality of density portions colored in gray of different densities according to the spectral absorption characteristics of color forming couplers of the film of the predetermined film type are formed. Although FIG. 10A shows a case in which four density portions are formed as an example, this is not to limit the number of the density portions. In the present second embodiment, films for correction value setting for a number of film types have been respectively prepared in advance.

Next, in step 117, the film for correction value setting being set in the film scanner 10 is conveyed by the film carrier, and a density portion thereof which has not yet been read is positioned in the reading position. The following steps 118 through 126 are the same as the correction value setting process relating to the first embodiment, and wherein second shading correction values for R, G and B for each block are respectively determined. Then, in step 127 next, the second shading correction values which have been determined for each block are associated with the film type of the film for correction value setting and density value of the density portion which has been read, and stored in the storage section 50A.

In step 129, whether all the density portions formed on the film for correction value setting have been read (and the second shading correction values have been set) or not is determined. If the determination is negative, the process returns to step 117 to repeat steps 117 through 127. If the determination in the step 127 is affirmative, the second shading correction values S2rj, S2gj and S2bj are respectively set for densities d1, d2 . . . of each of the density portions of each block of the film type of the film for correction value setting being set, as shown in following Table 1 as an example.

TABLE 1

| Block No. | Density | | |
|---|---|---|---|
| | d1 | d2 | ... |
| 1 | S2r$_1$, S2g$_1$, S2b$_1$ | S2r$_1$, S2g$_1$, S2b$_1$ | ... |
| 2 | S2r$_2$, S2g$_2$, S2b$_2$ | S2r$_2$, S2g$_2$, S2b$_2$ | ... |
| 3 | S2r$_3$, S2g$_3$, S2b$_3$ | S2r$_3$, S2g$_3$, S2b$_3$ | ... |
| ... | ... | ... | ... |

Once the second shading correction values for a single film type have been set, an affirmative determination is made in step 129 and the process proceeds to step 131, where, whether the second shading correction values for all the predefined film types have been set or not is determined. If the determination is negative, the process returns to step 116 to repeat step 116 and the following steps for a film type for which the second shading correction values have not yet been set. Thus, the second shading correction values for all the predefined film types are respectively set and stored.

Figure 8A:
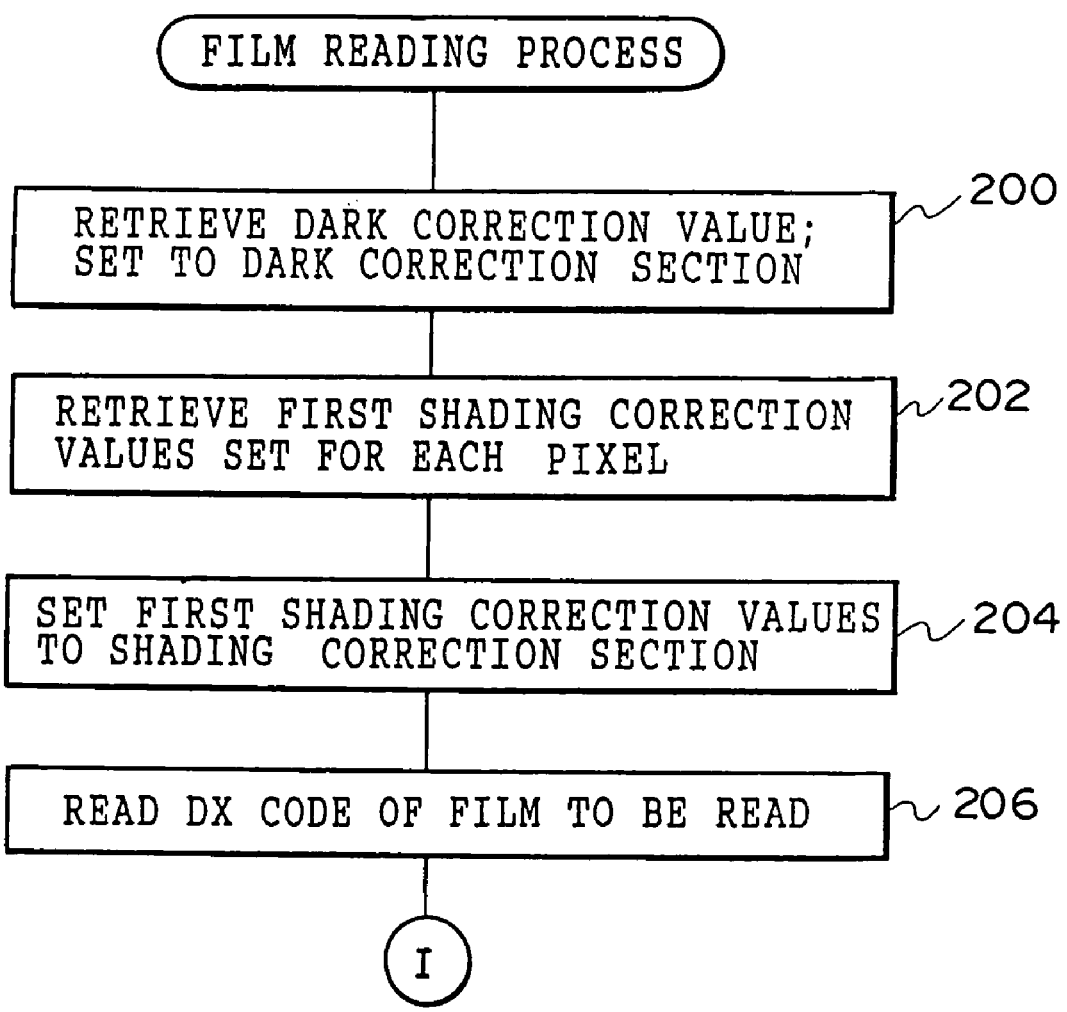
FIGS. 8A to 8C are flow charts showing a film reading process relating to the second embodiment.
Figure 8B:
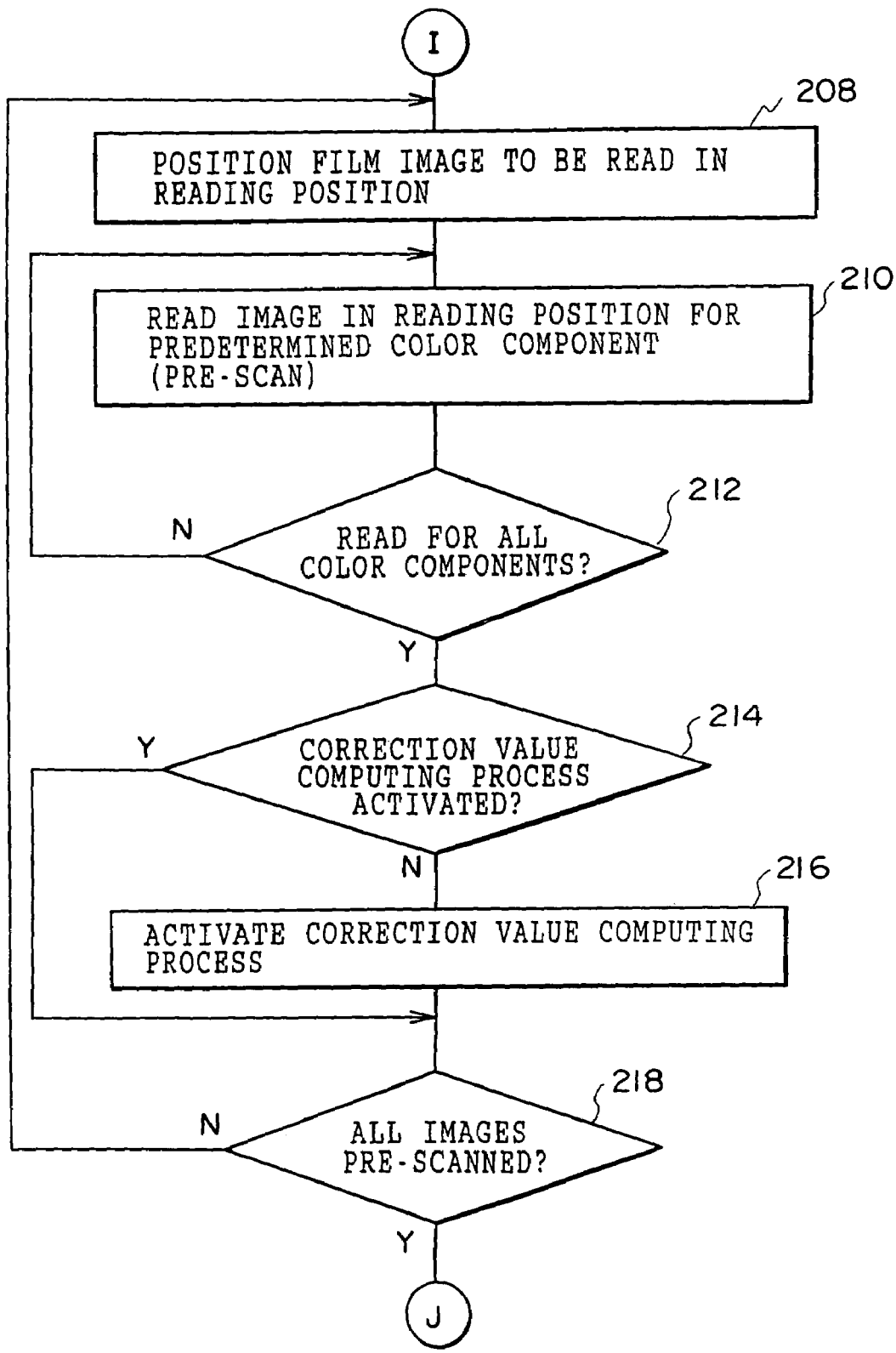
Figure 8C:
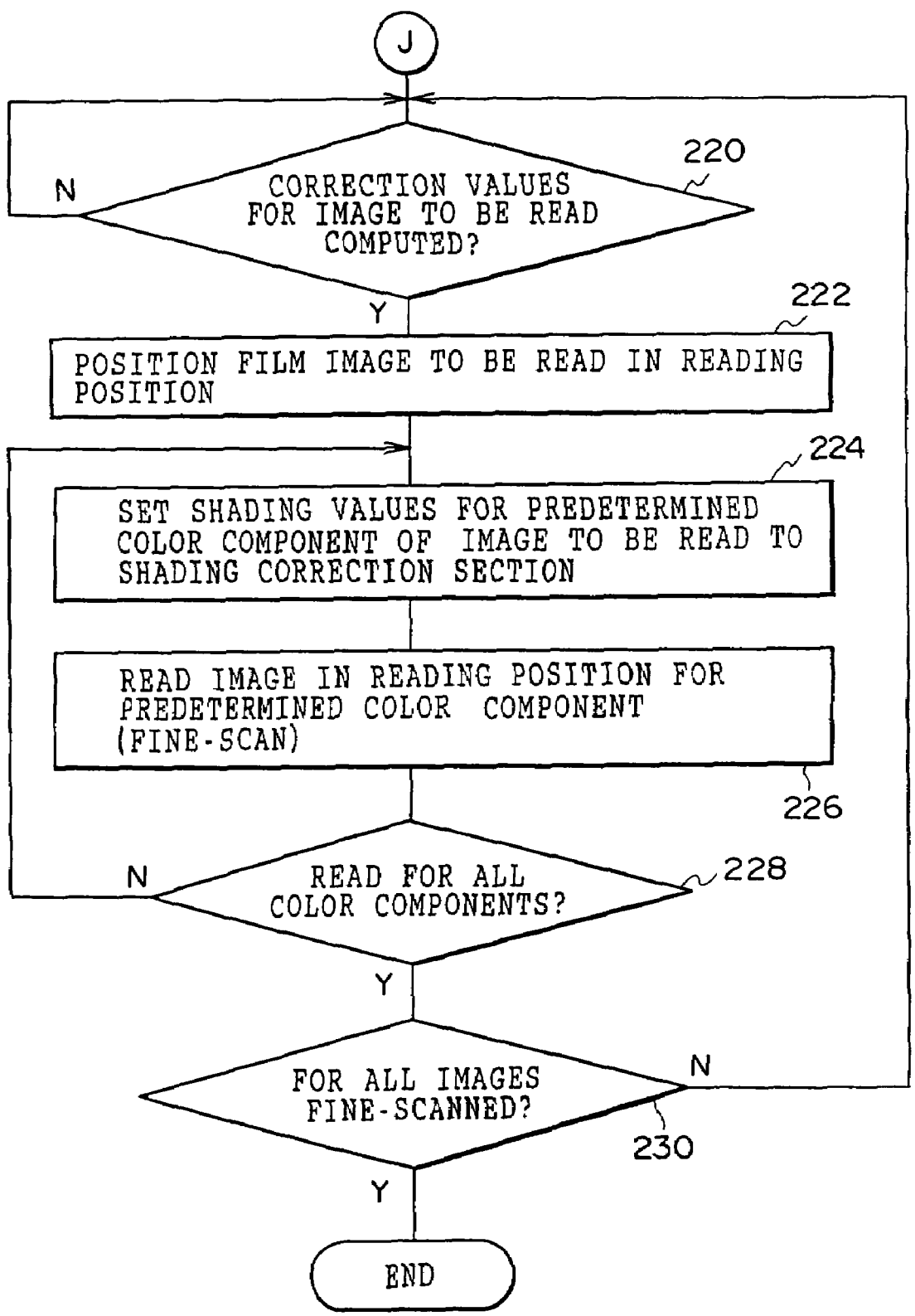

Referring to the flow charts of FIGS. 8A–8C, a film reading process relating to the present second embodiment is explained next. In the present second embodiment, each film image of the photographic film 16 to be read which is set in the film scanner 10 is read twice (pre-scan and fine-scan).

In step 200, the dark correction value Bj is retrieved from the storage section 50A and is set at the dark correction section 44. Further, in step 202, the first shading correction value S1j is retrieved from the storage section 50A, and the retrieved first shading correction value S1j is set at the shading correction section 46 in the next step 204. Thus, only the first shading correction is performed at the shading correction section 46. Further, in step 206, the DX code sensor is instructed to read a DX code of the photographic film 16 to be read, and the result of the reading is taken.

In step 208, the photographic film 16 to be read is conveyed by the film carrier in a predetermined direction, and a film image is positioned in the reading position. In step 210, the turret 26 is rotatably driven by the turret driving section 54 so that one of the color separation filters 28 of a color component x is positioned on the optical axis L, and the film image position in the reading positioned is read by the area CCD 32 (pre-scan). As reading conditions for pre-scan, reading conditions which have been set in advance so that an accumulated charge at each cell of the area CCD 32 does not saturate even when density of a film image is very low can be used.

Thus, the film image positioned in the reading position is read for a color component x, and image signals output from the area CCD 32 are amplified by the amplifier 40, A/D converted by the A/D converter 42, subjected to the dark correction at the dark correction section 44 as well as only the first shading correction at the shading correction section 46, and stored in the image memory 48 as image data.

In step 212 next, whether the film image being set in the reading position have been read for all the color components or not is determined. If the determination is negative, the process returns to step 210. Thus, the film image being set in the reading position is sequentially read for each color component, and image data of the film image is stored in the image memory 48.

In step 214 next, whether a correction value computing process has been already activated or not is determined. If the determination is negative, the process proceeds to step 216 to activate the correction value computing process. Thus, the correction value computing process (details are described later) is performed at the control section 50 in parallel with the film reading process. In step 218, whether all the film images recorded on the photographic film 16 to be read have been read or not is determined. If the determination is negative, the process returns to step 208 to position a next film image in the reading position, and the pre-scanning of the film image is repeated.

Once all the film images have been pre-scanned, second-time readings (fine-scan) are sequentially carried out while conveying the photographic film 16 to be read in a direction opposite to the predetermined direction or while conveying the photographic film 16 to be read in the predetermined direction after rewinding the photographic film 16 once. However, prior to fine-scanning, whether the computation of the shading correction values by the above mentioned correction value computing process for a film image to be fine-scanned next has been completed or not is determined in step 220, and the process waits until an affirmative determination is made in step 220.

Figure 9A:
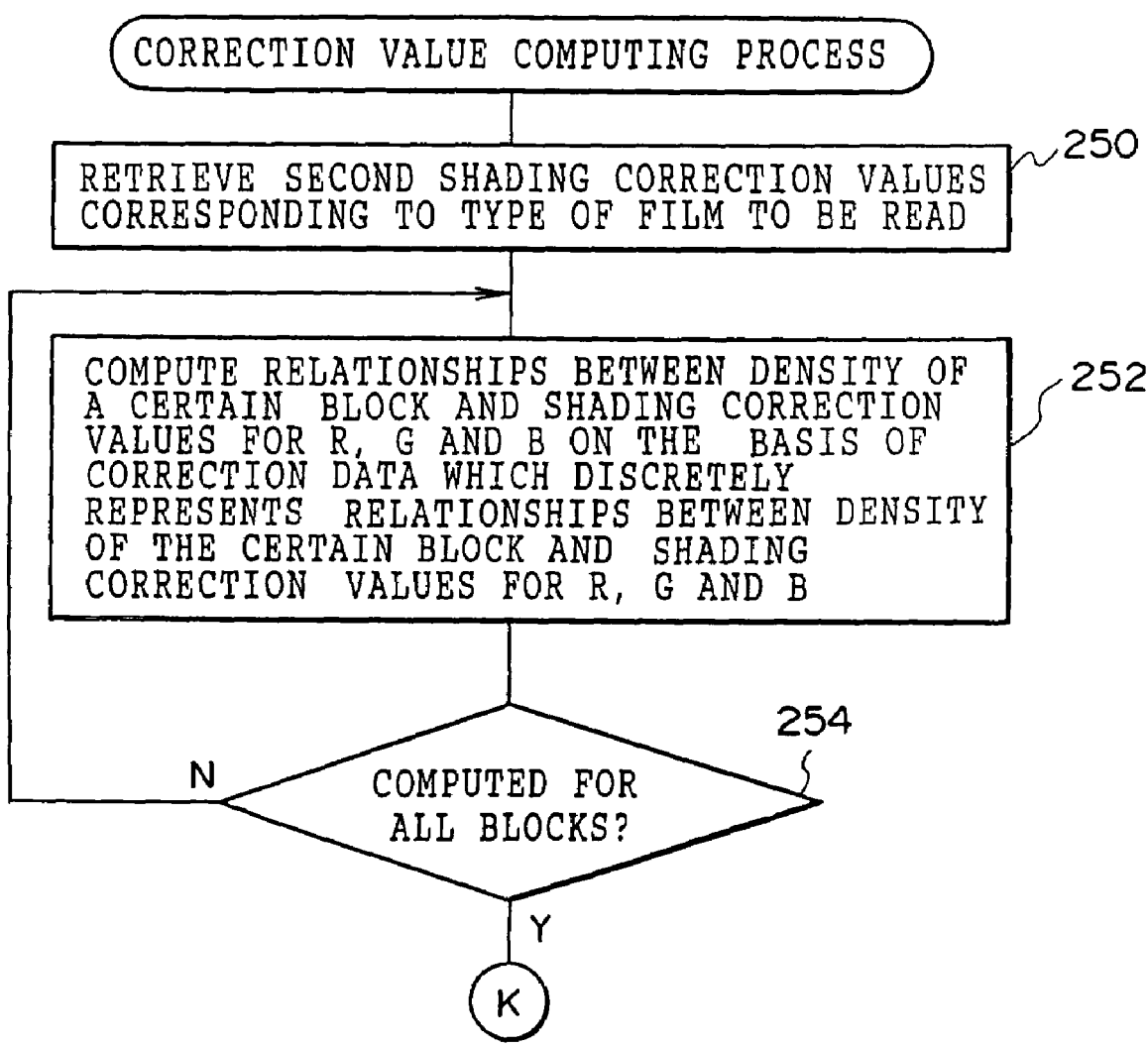
FIGS. 9A and 9B are flow charts showing a correction value computing process relating to the second embodiment.
Figure 9B:
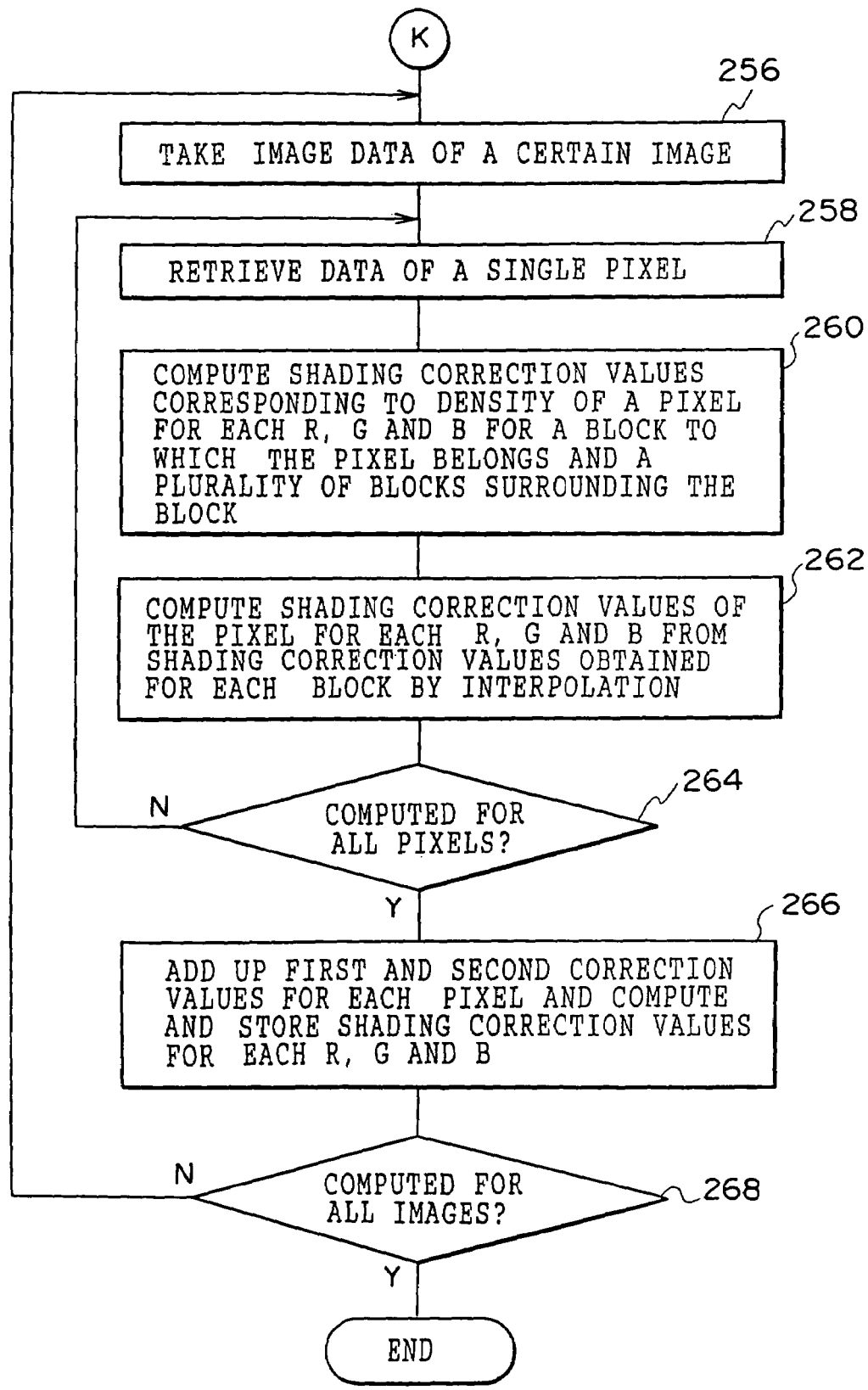

In the correction value computing process, as shown in FIGS. 9A and 9B, first, in step 250, the film type of the photographic film to be read is determined on the basis of the result of the DX code reading taken in step 206 of the film reading process (FIGS. 8A–8C), and the second shading correction values associated with the film type of the photographic to be read of the second shading correction values, which have been set by the above explained correction value setting process (FIGS. 7A–7C) and stored in the storage section 50A (the second shading values which have been set for each block and for each density), are retrieved from the storage section 50A.

Figure 10B:
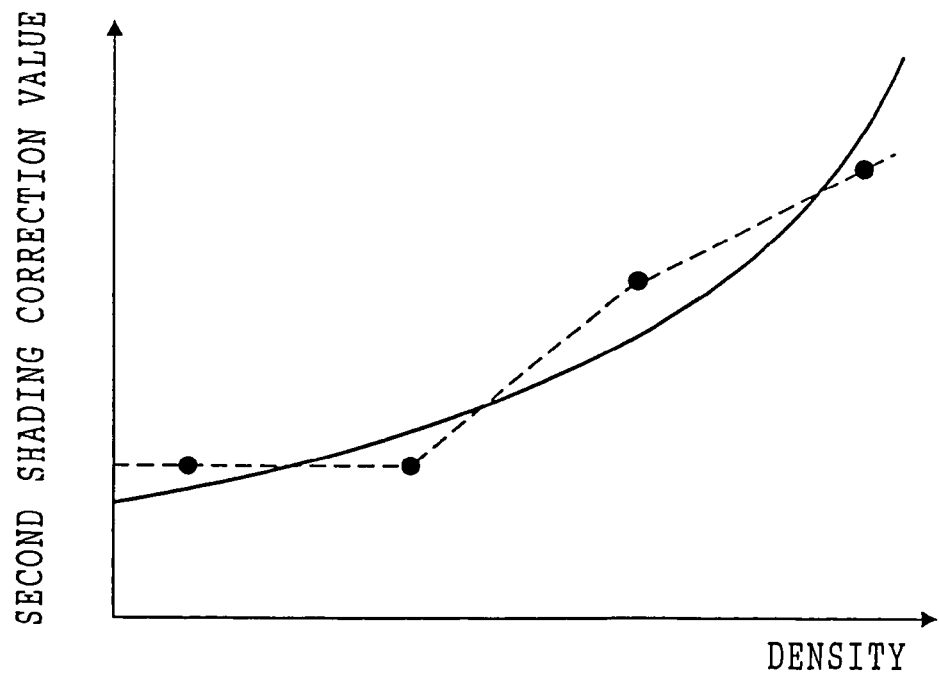
FIG. 10B is a diagram showing an example of a relationship between second shading correction values and densities.

By the way, the second shading correction values which have been retrieved in step 250 are data which respectively represents the second shading correction value for each of R, G and B of each block of a certain density (data which discretely represents relationships between densities and the second shading correction values for each of R, G and B of each block), as shown by "●" and the broken line in FIG. 10B as an example.

Therefore, in step 252 next, only data corresponding to a certain block is extracted from the second shading correction values retrieved in step 250, and approaches such as well known curve fitting, least square method, and the like are applied to the extracted data to compute relationships between a density of a certain block and the second shading correction values (see the solid line shown in FIG. 10B) for each of R, G and B, and then the results of the computation are stored. The relationships between the densities and the second shading correction values can be stored in a form of function expressions, conversion data being set in a LUT (look up table), or the like.

In step 254 next, whether all the blocks have been processed in step 252 or not is determined. If the determination is negative, the process returns to step 252 to compute relationships between the density and the second shading correction values for each of R, G and B of an unprocessed block and store the results. The actions in steps 250 through 254 may be performed in advance in the correction value setting process (FIGS. 7A–7C) described above.

Once the relationships between the densities and the second shading correction values are computed and stored for all the blocks, an affirmative determination is made in step 254 and the process proceeds to step 256, where, image data of a certain film image to be read which has been obtained by pre-scan of the film reading process (FIG. 8) is retrieved from the image memory 48. The actions in step 256 and the following steps are respectively carried out for all the film images recorded on the photographic film 16 to be read, and the film images can be processed in a order corresponding to the reading order of each film image in pre-scan (or fine-scan).

In step 258, data of a single pixel is retrieved from the image data retrieved in step 256. In step 260 next, for a block to which the pixel (pixel of interest), whose data has been retrieved, belongs and a plurality of blocks surrounding the block, the second shading correction values for R, G and B corresponding to the density of the pixel of interest are respectively computed on the basis of the relationships between the density and the second shading correction values for R, G and B computed for each block in step 252.

In step 262, the second shading correction values S2rj, S2gj and S2bj of the pixel of interest are derived by interpolation as in step 158 of the film reading process (FIGS. 5A and 5B) explained in the first embodiment, on the basis of the second shading correction values for R, G and B corresponding to the density of the pixel of interest respectively obtained for the block to which the pixel of interest belongs and the blocks surrounding the block in step 260.

Next, in step 264, whether all the pixels of the image data have been processed in steps 258 through 262 or not is determined. If the determination in step 264 is negative, the process returns to step 258 to repeat steps 258 through 262. Thus, the second shading correction values S2rj, S2gj and S2bj corresponding to the density of the pixel are computed by interpolation for all the pixels.

Once the second shading correction values for all the pixels have been computed, an affirmative determination is made in step 264 and the process proceeds to step 266, where, the shading correction values Srj, Sgj and Sbj are computer for the film image to be read by adding, for all the pixels, the second shading correction values S2rj, S2gj and S2bj computed in step 262 to the first shading correction value S1j which has been retrieved in step 202 of the film reading process (FIG. 8), and the results of the computation are stored in the storage section 50A:

$$Srj \leftarrow S1j+S2rj \quad Sgj \leftarrow S1j+S2gj \quad Sbj \leftarrow S1j+S2bj$$

Once the shading correction values for the single film image to be read have been computed in this manner, next, in step 268, whether the shading correction values for all the film images recorded on the photographic film 16 to be read have been computed or not is determined. If the determination in step 268 is negative, the process returns to step 256 to repeat steps 256 through 268.

Thus, in the present second embodiment, the shading correction values corresponding to a density of each pixel are computed for each pixel of all the film images recorded on the photographic film 16 to be read. Therefore, as described later, by performing the shading correction using the second shading correction values, the shading due to dispersion of the spectral sensitivity characteristic of the reading device can be precisely corrected regardless of a density of each pixel of a film image to be read.

While, once the shading correction values for a next film image to be read at fine-scan have been computed, an affirmative determination is made in step 220 of the film reading process (FIGS. 8A–8C) and the process proceeds to step 222, where, fine-scanning of the film image to be read is started. That is, in step 222, the photographic film 16 to be read is conveyed by the film carrier and the film image to be read is positioned in the reading position.

In step 224, the turret 26 is rotatably driven by the turret driving section 54 so that one of the color separation filters 28 of a color component x is positioned on the optical axis L, and the shading correction value Sxj for the color component x is set at the shading correction section 46. Then, in step 226, the film image to be read being positioned is read by the area CCD 32 (fine-scan). Reading conditions for fine-scan are desirably determined for each film image on the basis of the image data obtained at pre-scan so that an amount of an accumulated charge in each photoelectric conversion cell of the area CCD 32 is as large as possible within a range in which the accumulated charge does not saturate.

Thus, the film image positioned in the reading position is read for the color component x, and image signals output from the area CCD 32 are amplified by the amplifier 40, A/D converted by the A/D converter 42, subjected to the dark correction at the dark correction section 44 as well as the first shading correction and the second shading correction at the shading correction section 46, and stored in the image memory 48 as image data.

In step 228 next, whether the film image to be read has been read for all the color components or not is determined. If the determination is negative, the process returns to step 224 to repeat steps 224 through 228. Thus, the film image to be read is sequentially read for each color component, and image data of the film image is stored in the image memory 48.

In step 230, whether all the film images recorded on the photographic film 16 to be read have been read or not is determined. If the determination is negative, the process returns to step 220 to check to see that the shading correction values for the next film image to be read have been computed, and then, the film image is fine-scanned. When all the film images have been fine-scanned, an affirmative determination is made in step 230 and the film reading process ends.

In the second embodiment, a reading resolution at pre-scan and a reading resolution at fine-scan are desirably the same since the second shading correction values corresponding to a density of each pixel is obtained on the basis of the image data obtained by pre-scan. However, this is not to limit the present invention, and pre-scan may performed at a resolution lower than that for fine-scan. In this case, when the shading correction is performed on the image data obtained by fine-scan, the second shading correction values which have been derived for each pixel from the image data obtained by pre-scan may be respectively used for the shading correction of a plurality of pixels corresponding to a single pixel at pre-scan, thereby speeding computation and the like.

Further, in an aspect in which an area sensor (the area CCD 32) is used as a reading sensor as in the above embodiments, switching of reading resolutions (to obtain image data at a different resolution for each time of reading) can be accomplished by, for example, reading an image for pre-scan at the same high resolution as for fine-scan, and then performing post-processing such as pixel thinning or pixel integration on obtained image data; or, for fine-scanning, performing several readings by the area sensor by moving the area sensor a distance corresponding to an integer fraction of a pixel spacing with an actuator, such as a piezoelectric device, after each time of reading.

Although the second shading correction values have been set and stored respectively for a negative film and a reversal film in the first embodiment, and for every predefined film type in the second embodiment, these are not to limit the present invention. Photographic films of various types may be grouped so that those having similar characteristics belong to the same group, and the second shading correction values may be set and stored for each group.

Further, although an area sensor has been used as a reading device relating to the present invention in the above, this is not to limit the present invention and other sensors such as a line sensor may be used. When a reading area is smaller than a single image and the single image is separately read a plurality of times (such as in a case of a line sensor in which a reading area is a line having a width of a pixel), the shading correction value setting and the shading correction may be carried out for each reading area. In a case of a line sensor for example, a linear reading area of a pixel width may be divided into a plurality of blocks along a longitudinal direction, and shading correction values of a pixel to be computed may be derived from shading correction values of each of two blocks.

Furthermore, although the second shading correction values have been set and stored for each block and the second shading correction values for each pixel are derived by interpolation in the above, this is not to limit the present invention, and the second shading correction values for each pixel may be set and stored.

Figure 11:
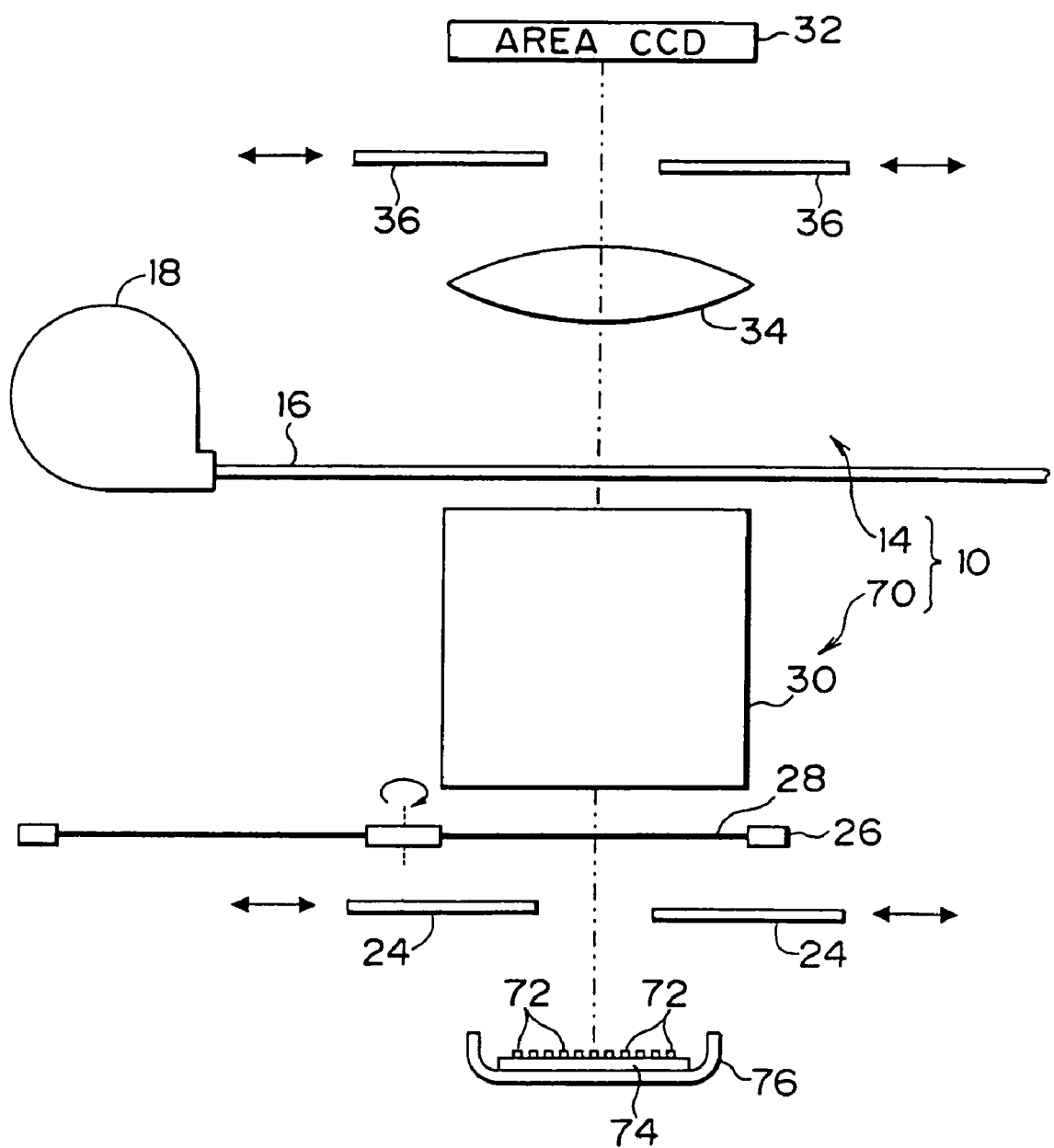
FIG. 11 is a side view showing a schematic structure of another example of the optical system of the film scanner.

Further, although the film scanner 10 which is provided with the light source section 12 including the lamp 20 formed by a halogen lamp or the like (a single point light source) has been explained as an example of an apparatus for reading an image relating to the present invention, this is not to limit the present invention. For example, as shown in FIG. 11, a light source section 70 which is provided with a plurality of light emitting sources 72 (either point light source or line light source) may be employed. The light source section 70 is provided with a substrate 74, which has the plurality of light emitting sources 72 being provided on one of the surfaces thereof and is disposed so that the surface thereof provided with the light emitting sources 72 faces the light diffusion box 30; and a reflector 76, which is placed in the vicinity of the substrate 74, for reflecting a portion of light emitted from the light emitting source 72 toward the light diffusion box 30.

Figure 12A:
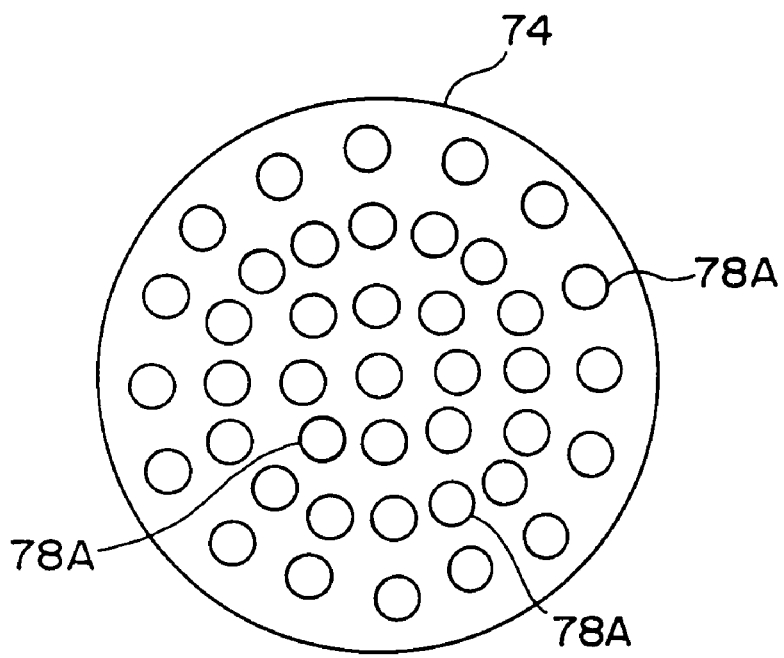
FIGS. 12A and 12B are plan views showing an example of light emitting sources applicable to the film scanner shown in FIG. 11.

As the light emitting sources 72 described above, for example, LEDs 78A (see FIG. 12A) which emit light including light of respective R, G and B wavelength ranges (white light) can be employed. By arranging the plurality of LEDs 78A on the substrate 74 so as to distribute the LEDs 78A substantially evenly, the photographic film 16 can be irradiated with white light as in the case in which the lamp 20 formed by a halogen lamp or the like is employed. Since LEDs are generally lower in cost and smaller in power consumption when compared with a halogen lamp or the like, cost reduction and power consumption reduction of the film scanner can be achieved by using a light source section having the above described structure.

Figure 13A:
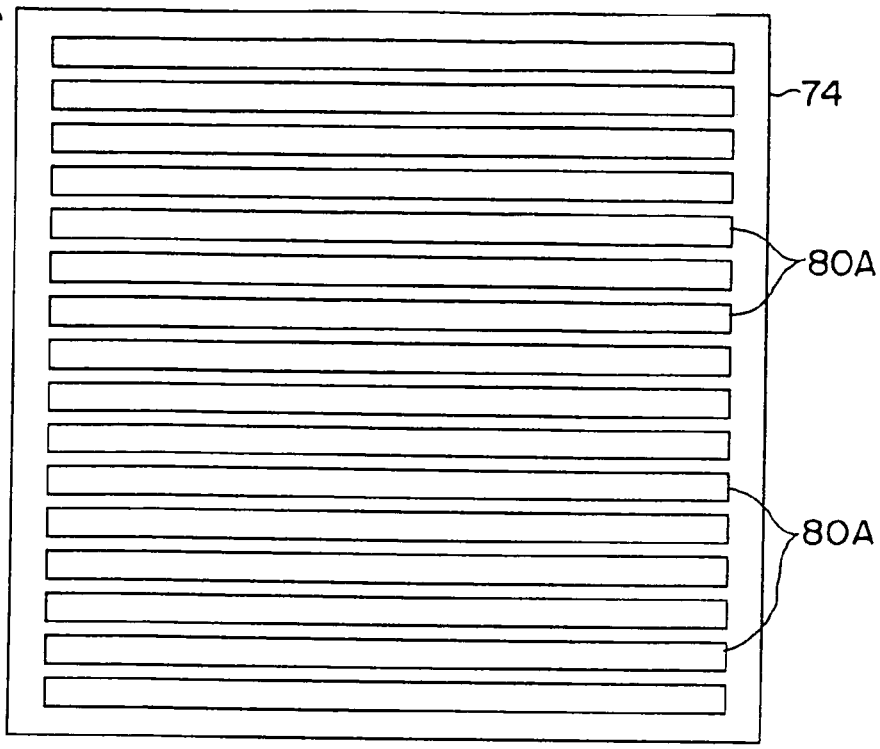
FIGS. 13A and 13B are plan views showing another example of the light emitting sources applicable to the film scanner shown in FIG. 11.

Alternatively, as the light emitting sources 72 shown in FIG. 11, cathode ray tubes 80A (see FIG. 13A: either cold-cathode tubes or hot-cathode tubes) which emit white light may be employed. Also, by arranging the cathode ray tubes 80A on the substrate 74 with a substantially constant spacing, the photographic film 16 can be irradiated with white light as in the case in which the lamp 20 formed by a halogen lamp or the like is employed.

Figure 12B:
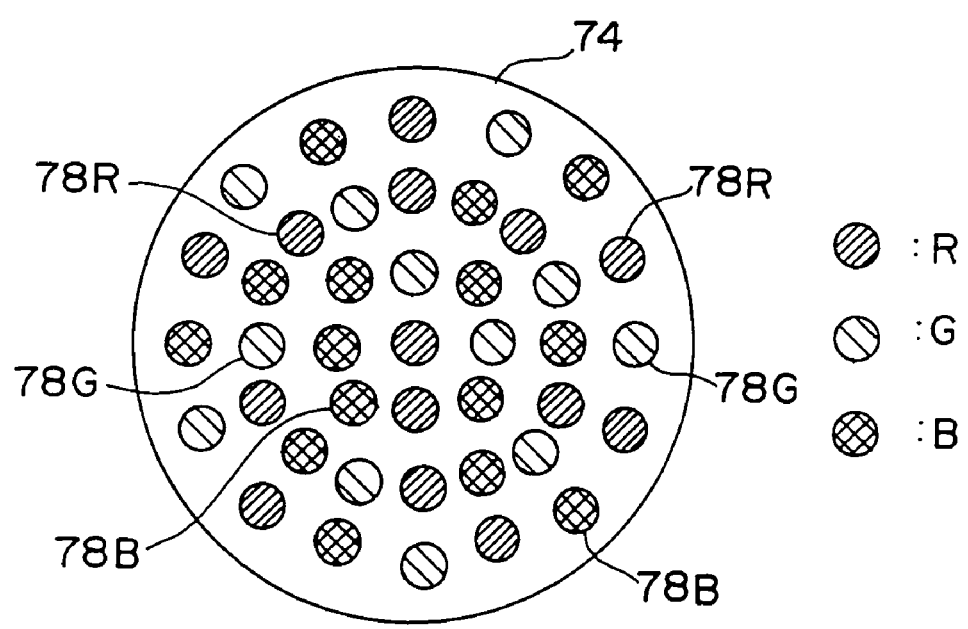

Further, the light emitting sources 72 are not limited to those emit white light, and for example, as shown in FIG. 12B, LEDs 78R which emit light of a wavelength range corresponding to red, LEDs 78G which emit light of a wavelength range corresponding to green and LEDs 78B which emit light of a wavelength range corresponding to blue being arranged so as to be distributed substantially evenly on the substrate 74 may be employed as the light emitting sources 72. The LEDs 78R, 78G and 78B of respective colors may have the same distribution density on the substrate 74, however, when there are differences between light emission intensities of the LEDs of respective colors, and the like, the LEDs for the respective colors may have different distribution densities in accordance with the light emission intensities of the respective colors, and the like.

As described above, when the LEDs 78R, 78G and 78B of the respective three colors are employed as the light emitting sources 72, the photographic film 16 can be irradiated sequentially with light of respective red, green and blue wavelength ranges by turning on the LEDs 78R, 78G and 78B of the respective three colors sequentially. Therefore, the turret 26, the color separation filters 28, the turret driving section 54, and the like, can be omitted. Also, when the LEDs 78R, 78G and 78B are employed as the light emitting sources 72, cost reduction and power consumption reduction of the film scanner can be achieved, as in the case in which the LEDs 78A are employed.

Figure 13B:
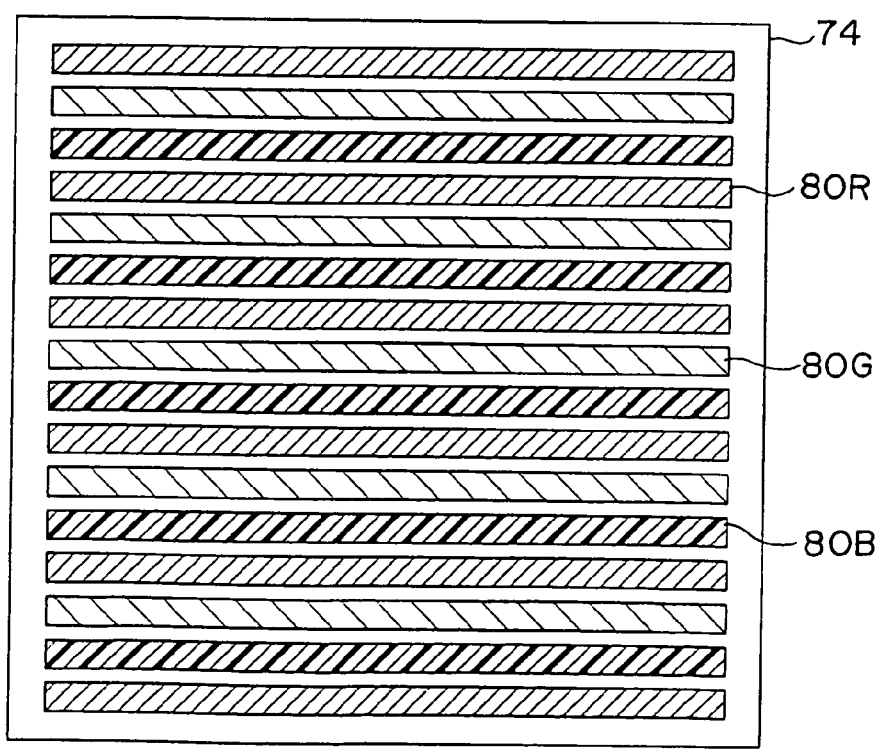

Further, for example, as shown in FIG. 13B, cathode ray tubes 80R which emit light of a wavelength range corresponding to red, cathode ray tubes 80G which emit light of a wavelength range corresponding to green and cathode ray tubes 80B which emit light of a wavelength range corresponding to blue being arranged with a substantially constant spacing so as to be distributed substantially evenly on the substrate 74 may be employed as the light emitting sources 72. When the cathode ray tubes 80R, 80G and 80B are employed as the light emitting sources 72, the photographic film 16 can also be irradiated sequentially with light of respective red, green and blue wavelength ranges by turning on the cathode ray tubes 80R, 80G and 80B sequentially. Therefore, the turret 26, the color separation filters 28, the turret driving section 54, and the like, can be omitted.

Furthermore, although the case in which the film type of the photographic film 16 is identified on the basis of the result of the detection of the DX code which is a kind of the code of the ninth aspect has been described above, this is not to limit the present invention. For example, when the photographic film to be read is a photographic film which is provided with a transparent magnetic layer for recording, as code information, various information including the film type (a 240 size photographic film: a so-called APS film), the film type may be identified by reading the code information recorded on the magnetic layer, or when the photographic film to be read is a photographic film which is contained in a cartridge provided with an IC for storing, as code information, various information including the film type, the film type can be identified by reading the code information stored in the IC.

In addition, although the present invention has been explained using a photographic film as an original relating to the present invention as an example, this is not to limit the present invention, and a transparent original other than a photographic film or a reflective original such as a printed photograph or a printed image may be used. When no information representing a type of an original in an easily readable form, such as a DX code recorded on a photographic film, is recorded on the original to be read, an operator may input the type of the original to be read via a keyboard 64 (or other information input devices), and the shading correction values may be selected according to the input type of the original.

As explained above, the present invention corrects the read data obtained by reading an original to be read by the reading device on the basis of correction values for correcting irregularity of data in the reading area of the reading device which are set on the basis of data obtained by reading a predetermined original of a type the same or similar to that of the original to be read. Therefore, an excellent effect, that shading due to dispersion of the spectral sensitivity characteristic in the reading area of the reading device can be precisely corrected, is obtained.

Further, the present invention sets the correction values for each of color components and corrects the read data for each of the color components on the basis of the correction values. Therefore, in addition to the above described effect, an effect, that shading which appears as irregularity of color on the read data can be corrected, is obtained.

Furthermore, the present invention determines a type of a photographic film to be read on the basis of a code recorded on the photographic film to be read or on a cartridge accommodating the photographic film to be read, and corrects the read data on the basis of correction values for a photographic film of the same or similar type to that of the photographic film to be read. Therefore, in addition to the above described effect, an effect, that correction values corresponding to the type of the photographic film to be read can be automatically selected from the several types of correction values using a simple structure, is obtained.

In addition, the present invention corrects the read data on the basis of correction values for an original of the same or similar type to that of the original to be read, which type is taught by the teaching device for teaching the type of the original. Therefore, in addition to the above described effect, an effect, that correction values corresponding to a type of an original can be selected with certainty even when no information which represents the type of the original is given to the original, or the like, is obtained.

Further, the present invention sets correction values for each of partial regions of the reading area of the reading device when the reading area is divided into the partial regions formed of pixels fewer than pixels forming the reading area, and derives, for all pixels corresponding to the reading area, correction values for a pixel of interest from correction values set for each of the partial regions neighboring the pixel of interest by interpolation. Therefore, in addition to the above described effect, an effect, that memory size of the storage device for storing the correction values can be reduced, is obtained.

Furthermore, the present invention uses, as correction values, data defining, for each portion of the reading area, relationships between density of the original represented by the read data and correction values for correcting irregularity of data obtained by reading portions of densities on the original, and obtains correction values for each pixel of the read data on the basis of the correction values stored in the storage device and density of each pixel of the read data. Therefore, in addition to the above described effect, it has an effect that shading due to dispersion of the spectral sensitivity characteristic of the reading device can be precisely corrected regardless of density of each pixel of the original to be read.

What is claimed is:

1. An apparatus for reading an image, the apparatus comprising:
   (a) a reading device having a plurality of photoelectric conversion cells, which receive light transmitted through or reflected from an original, and produce electronic information representing the image as a plurality of pixels; and
   (b) a data processing system electronically connected to the reading device and receiving the electronic information therefrom, the data processing system including a memory and logic, the logic defining the electronic information as being divided into a plurality of areas, with each area comprising a plurality of the pixels, and corrects for reading discrepancies in the reading device by applying data correction values to the electronic information corresponding to each area, with the data correction values stored in the memory, and previously obtained by reading a predetermined image of at least one type corresponding or similar to the original,
   wherein the original is a photographic film, and the predetermined original is a photographic film corresponding or similar to the photographic film of the original, exposed to an amount of light corresponding to an amount of gray in the original.

2. The apparatus of claim 1, wherein the predetermined image of the type corresponding or similar to the original has a spectral absorption characteristic approximate to that of the original.

3. The apparatus of claim 1, wherein the reading device includes at least one type of color filter for producing electronic image information corresponding to a plurality of color separated components, wherein there are data correction values stored in the memory for each of the color components, and the logic applies data correction values in accordance with each of the color components to the electronic information representing the original.

4. The apparatus of claim 3, wherein the reading device is configured to read the original by separating the original into a plurality of color components using a color separation filter, and dispersion of the spectral absorption characteristic in a reading area of the reading device is caused at least by dispersion of a characteristic of the color separation filter in the reading area of the reading device.

5. The apparatus of claim 4, wherein the reading device is a line sensor provided with the color separation filter.

6. The apparatus of claim 1, further comprising a light source section comprising a plurality of point light sources or line light sources, wherein the reading device reads the original by using light emitted from the light source section and transmitted through or reflected from the original.

7. The apparatus of claim 6, wherein the light source section is only located on a side of the original opposite to the other side of the original facing the reading device.

8. The apparatus of claim 1, further comprising a light source section comprising LEDs as light emitting sources, wherein the reading device reads the original by using light emitted from the light source section and transmitted through or reflected from the original.

9. The apparatus of claim 1, wherein the original is a photographic film including a code recorded on the film, or the original is a photographic film accommodated in a cartridge with the code recorded on the cartridge, and the reading device reads the code and produces electronic information corresponding to the code, and the information processing system receives the electronic information corresponding to the code and retrieves from the memory, data correction values for a photographic film corresponding to that code.

10. The apparatus of claim 1, further comprising a user input device electronically connected to the information processing system, for entering information identifying the original type, which is received by the information processing system, and the logic retrieves from the memory data correction values corresponding or similar to that type.

11. The apparatus of claim 1, wherein the data correction values corresponding to the areas, correspond to a plurality of regions forming each area, with the quantity of regions forming each area being less than the quantity of pixels forming that area, and the logic determines a correction for each pixel in that area by interpolation.

12. The apparatus of claim 1, wherein the predetermined original includes areas of different image densities, and the logic applies the data correction values to the electronic information received for the original based on density of data.

13. The apparatus of claim 1, further comprising a turret for rotating so that color separation filters are positioned on an optical axis.

14. The apparatus of claim 1, said data processing system correcting reading discrepancies based on characteristics of hardware in the apparatus.

15. The apparatus of claim 14, wherein the reading discrepancies comprise spectral shift caused by the hardware.

16. The apparatus of claim 1, wherein the plurality of areas comprise spatial adjacent areas and are corrected by interpolation from adjacent areas.

17. A method for reading an original with an image reading device having a plurality of photoelectric conversion cells, the method comprising:
   (a) providing a predetermined image of a type the same or similar to that of the original;
   (b) using the image reading device to read the predetermined image and produce electronic information representing the predetermined image;
   (c) determining data correction values for use with electronic information representing the original based on the electronic information representing the predetermined image;
   (d) using the image reading device to read the original and produce electronic information representing the original; and
   (e) correcting the electronic information representing the original by applying the data correction values,
   wherein the original is a photographic film, and providing a predetermined image includes exposing a photographic film of the same or similar type to that of the original, to light in an amount corresponding to an amount of gray in the original.

18. The method of claim 17, wherein the predetermined image of the type corresponding or similar to the original has a spectral absorption characteristic approximate to that of the original.

19. The method of claim 17, wherein using the image reading device to read the predetermined image and the original, includes producing electronic information corresponding to a plurality of color separated components, and determining data correction values includes determining data correction values for each color component, and correcting the electronic information includes applying the data correction values for each color component.

20. The method of claim 19, wherein the reading device reads the original by separating the original into a plurality of color components using a color separation filter, and dispersion of the spectral absorption characteristic in a reading area of the image reading device is caused at least by dispersion of a characteristic of the color separation filter in the reading area of the image reading device.

21. The method of claim 20, wherein the image reading device is a line sensor provided with the color separation filter.

22. The method of claim 17, wherein the image reading device reads the original using light emitted from a light source section in the image reading device, the light source section comprising a plurality of point light sources or line light sources, and transmitted through or reflected from the original.

23. The method of claim 22, wherein the light source section is only located on a side of the original opposite to the other side of the original facing the reading device.

24. The method of claim 17, wherein the image reading device reads the original by using light emitted from a light source section in the image reading device, the light source section comprising LEDs as light emitting sources, and transmitted through or reflected from the original.

25. The method of claim 17, wherein the original is a photographic film having a code recorded on the film, or the original is film accommodated in a cartridge, with the code recorded on the cartridge, the method further comprising determining the type of photographic film based on the code, for providing a predetermined image of the same or similar film type.

26. The method of claim 17, further comprising inputting the original type.

27. The method of claim 17, wherein the electronic information represents an image by a plurality of pixels, and determining data correction values includes deriving data correction values corresponding to regions of the predetermined image, with each region being formed by a plurality of pixels, and correcting the electronic information includes interpolation between data correction values of different regions, to apply a correction to each pixel.

28. The method of claim 17, wherein providing a predetermined image includes providing a predetermined image having different image densities, and correcting the electronic information is performed at least in part, by applying data correction values based on density of data.

* * * * *